United States Patent
Lin et al.

(10) Patent No.: US 11,697,392 B2
(45) Date of Patent: Jul. 11, 2023

(54) SECURITY MECHANISMS FOR ELECTRIC MOTORS AND ASSOCIATED SYSTEMS

(71) Applicant: Gogoro Inc., Hong Kong (CN)

(72) Inventors: Shih-Yuan Lin, Taipei (TW); Yu-Se Liu, New Taipei (TW); Liang-Yi Hsu, Miaoli (TW)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 16/207,068

(22) Filed: Nov. 30, 2018

(65) Prior Publication Data

US 2019/0173399 A1 Jun. 6, 2019

Related U.S. Application Data

(60) Provisional application No. 62/650,916, filed on Mar. 30, 2018, provisional application No. 62/650,895, filed on Mar. 30, 2018, provisional application No. 62/593,854, filed on Dec. 1, 2017.

(51) Int. Cl.
*H02P 3/22* (2006.01)
*H02P 27/06* (2006.01)
*B60R 25/04* (2013.01)
*B62H 5/08* (2006.01)
*H02P 3/02* (2006.01)

(52) U.S. Cl.
CPC ............... *B60R 25/04* (2013.01); *B62H 5/08* (2013.01); *H02P 3/025* (2013.01); *H02P 3/22* (2013.01); *H02P 27/06* (2013.01)

(58) Field of Classification Search
CPC ............. H02P 3/22; H02P 27/06; B60R 25/04
See application file for complete search history.

(56) References Cited

U.S. PATENT DOCUMENTS

| 502,500 A | 8/1893 | Perkins |
| 748,684 A | 1/1904 | Andersen et al. |
| 4,019,782 A | 4/1977 | Reppert |
| 5,795,036 A | 8/1998 | Campagnolo |

(Continued)

FOREIGN PATENT DOCUMENTS

| CA | 2655495 | 8/2010 | |
| CA | 2655495 A1 * | 8/2010 | ............. B62K 13/00 |

(Continued)

OTHER PUBLICATIONS

European Search Report for EP Application No. 18209464.9, Applicant: Gogoro Inc., dated Apr. 2, 2019, 4 pages.

(Continued)

*Primary Examiner* — Muhammad S Islam
*Assistant Examiner* — Bradley R Brown
(74) *Attorney, Agent, or Firm* — Perkins Coie LLP

(57) ABSTRACT

The present disclosure relates to security mechanisms for electric motors and associated systems. For example, the present technology includes a powertrain assembly having (1) a motor having multiple sets of coils; (2) a drive circuitry electrically coupled to the multiple sets of coils; and (3) a security unit electrically coupled to the drive circuitry and the multiple sets of coils. The security unit is configured to short-circuit at least one set of the multiple sets of coils responsive to a signal from a controller. The signal indicates that the motor is, or has been, turned off.

17 Claims, 21 Drawing Sheets

(56) References Cited

U.S. PATENT DOCUMENTS

| | | | |
|---|---|---|---|
| 5,920,193 A | 7/1999 | Tola et al. | |
| 6,057,657 A * | 5/2000 | Kitamura | B62H 5/08 318/16 |
| 6,617,746 B1 | 9/2003 | Maslov et al. | |
| 6,765,323 B2 | 7/2004 | Takano et al. | |
| 6,787,951 B2 | 9/2004 | Maslov et al. | |
| 7,156,196 B2 | 1/2007 | Katsaros | |
| 7,182,410 B2 | 2/2007 | Fukui | |
| 7,273,259 B2 | 9/2007 | Fukui | |
| 7,284,631 B2 | 10/2007 | Rizzetto | |
| 7,370,720 B2 | 5/2008 | Kokatsu et al. | |
| 7,375,450 B2 | 5/2008 | Tanaka et al. | |
| 7,540,571 B2 | 6/2009 | Yamaguchi | |
| 8,960,354 B2 | 2/2015 | Lin et al. | |
| 9,669,897 B2 | 6/2017 | Zanfei | |
| 9,821,597 B2 | 11/2017 | Koshiyama et al. | |
| 9,925,826 B2 | 3/2018 | Koshiyama et al. | |
| 9,962,991 B2 | 5/2018 | Koshiyama et al. | |
| 10,500,950 B2 | 12/2019 | Wu | |
| 2002/0156577 A1* | 10/2002 | Flick | G08G 1/20 701/469 |
| 2003/0062782 A1 | 4/2003 | Takano et al. | |
| 2003/0193264 A1 | 10/2003 | Pyntikov et al. | |
| 2003/0213630 A1* | 11/2003 | Pyntikov | B60L 50/20 180/220 |
| 2004/0164624 A1* | 8/2004 | Suzuki | H02K 5/1732 310/12.26 |
| 2007/0252452 A1 | 11/2007 | Ishimoto et al. | |
| 2011/0042156 A1 | 2/2011 | Vincenz | |
| 2011/0133542 A1 | 6/2011 | Ratti et al. | |
| 2012/0161495 A1 | 6/2012 | Ito | |
| 2012/0169154 A1 | 7/2012 | Curodeau | |
| 2013/0049549 A1 | 2/2013 | Folmli et al. | |
| 2013/0068549 A1 | 3/2013 | Laprade | |
| 2013/0207448 A1 | 8/2013 | Koshiyama et al. | |
| 2013/0328512 A1* | 12/2013 | Ozaki | B60L 3/04 318/453 |
| 2014/0035347 A1 | 2/2014 | Zanfei et al. | |
| 2014/0097672 A1 | 4/2014 | Takemura et al. | |
| 2015/0020621 A1 | 1/2015 | Kawakami | |
| 2016/0009169 A1 | 1/2016 | Biderman et al. | |
| 2016/0014252 A1 | 1/2016 | Biderman et al. | |
| 2016/0068223 A1 | 3/2016 | Zanfei | |
| 2016/0075177 A1 | 3/2016 | Biderman et al. | |
| 2016/0075225 A1 | 3/2016 | Aich et al. | |
| 2016/0082772 A1 | 3/2016 | Biderman et al. | |
| 2016/0149167 A1 | 5/2016 | Jung | |
| 2016/0159435 A1 | 6/2016 | Yehuda et al. | |
| 2016/0243927 A1 | 8/2016 | Biderman et al. | |
| 2016/0280300 A1 | 9/2016 | Latzke | |
| 2017/0036735 A1 | 2/2017 | Douglas et al. | |
| 2017/0297616 A1* | 10/2017 | Kikuchi | B62D 5/0487 |
| 2017/0368943 A1 | 12/2017 | Von Novak, III et al. | |
| 2018/0111487 A1 | 4/2018 | Xu et al. | |
| 2019/0185106 A1 | 6/2019 | Lin et al. | |
| 2019/0202526 A1 | 7/2019 | Lin et al. | |
| 2019/0315241 A1 | 10/2019 | Lin et al. | |
| 2020/0114753 A1 | 4/2020 | Biderman et al. | |

FOREIGN PATENT DOCUMENTS

| | | |
|---|---|---|
| CN | 103221250 A | 7/2013 |
| CN | 103338963 A | 10/2013 |
| CN | 103600789 | 2/2014 |
| CN | 106600781 A | 4/2017 |
| JP | S57-158733 | 4/1984 |
| JP | 2000-211574 | 8/2000 |
| JP | 2002264860 | 9/2002 |
| JP | 2006-327581 | 12/2006 |
| JP | 5511052 | 6/2014 |
| KR | 20-1992-0017027 | 4/1994 |
| KR | 10-2016-0050353 | 5/2016 |
| WO | 2010070717 | 6/2010 |

OTHER PUBLICATIONS

Office Action received for co-pending Taiwanese Application No. TW 107143122; Applicant: Gogoro Inc., dated Sep. 4, 2019, 15 pages.

Office Action received for co-pending Japanese Application No. JP2018-224714; Applicant: Gogoro Inc., dated Nov. 26, 2019, 4 pages.

Office Action received for co-pending Korean Application No. KR10-2018-0152577; Applicant: Gogoro Inc., dated Mar. 18, 2020, 12 pages.

Office Action received for co-pending Chinese Application No. CN201811454476.7, Applicant: Gogoro Inc., dated Jan. 19, 2021, 8 pages.

Office Action dated Nov. 2, 2022 for Chinese Patent Application No. 201811454476.7, 7 pages.

Baolin, Qi , et al., "200 cases of practical motor control circuits", Fuzhou: Fujian Science and Technology Press, 2004. 6, ISBN 7-5335-2368-7, with English translation of relevant sections, pp. 102-104.

* cited by examiner

SECURITY MECHANISMS FOR ELECTRIC MOTORS AND ASSOCIATED SYSTEMS

CROSS-REFERENCE TO RELATED APPLICATION

The present application claims the benefit of and priority to U.S. Provisional Applications No. 62/593,854, filed Dec. 1, 2017, No. 62/650,895, filed Mar. 30, 2018, and No. 62/650,916, filed Mar. 30, 2018, which are incorporated herein by reference in their entirety.

TECHNICAL FIELD

The present technology is directed to security mechanisms and associated systems for electric motors. More particularly, the present technology is directed to a "coil-based" security mechanism or system that can generate a countering torque in response to unauthorized user actions.

BACKGROUND

It is important to have a security mechanism or system for a vehicle to prevent an unauthorized use. Conventionally, for example, a user can install or put a physical lock (e.g., a bike lock) on a wheel of the vehicle to prevent an unauthorized use. Sometimes, however, installing a conventional lock can be troublesome and inconvenient. For example, a user may need to carry a key to unlock the conventional lock. As another example, sometimes a user's hands can be full and therefore installing/locking/unlocking the conventional lock can be bothersome. Moreover, attempting to move a vehicle that is locked by a conventional lock may result in permanent damages to the vehicle. Therefore, there is a need for an improved security mechanism or system to address the foregoing issues.

Figure 1A:
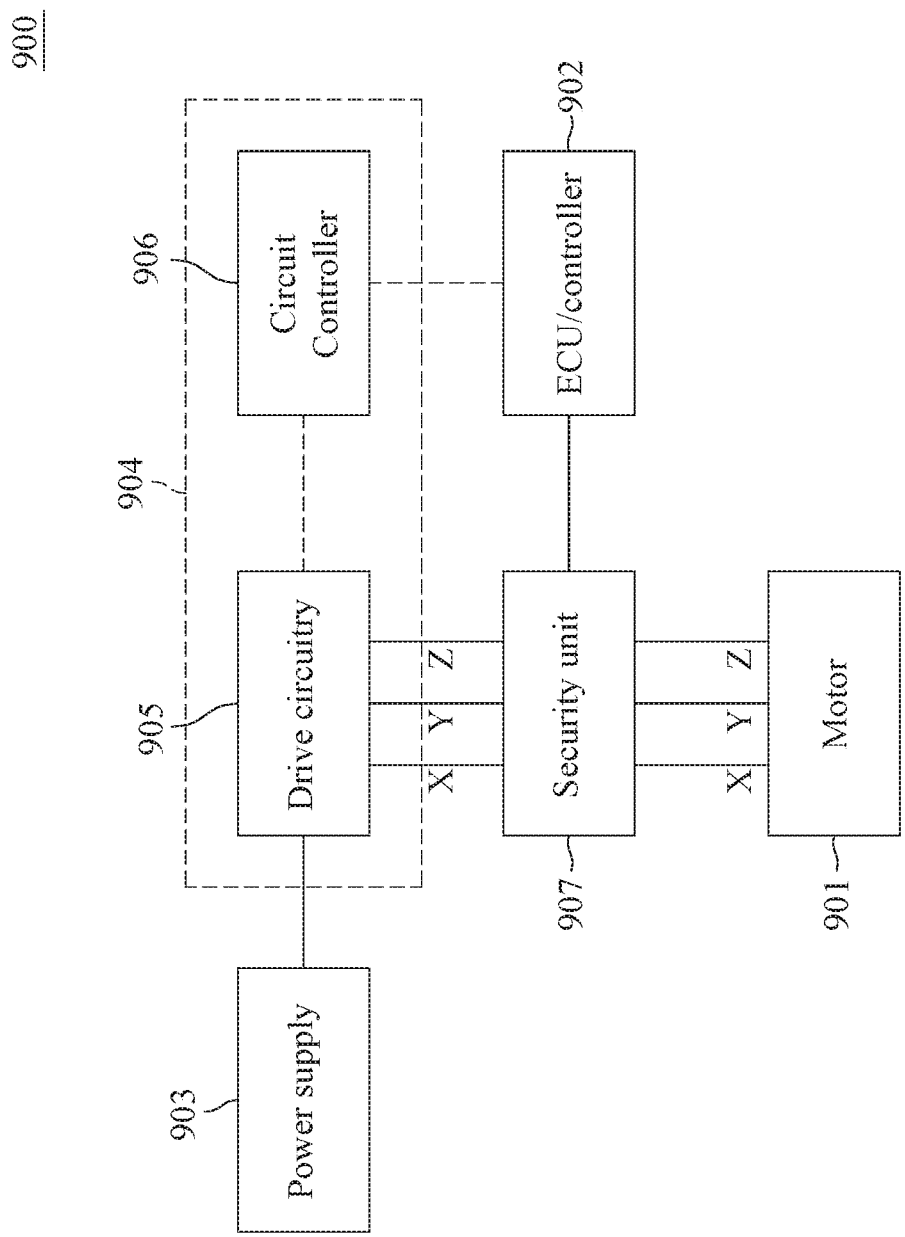
FIG. 1a is a block diagram illustrating a system in accordance with an embodiment of the present technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

The present technology is directed to a security mechanism or system for an electric motor with multiple sets of coils. In some embodiments, when the electric motor is turned off (or has been turned off for a predetermined time period, such as 5-10 minutes), the security system short-circuits part or all sets of the multiple sets of coils. In this disclosure, "short-circuiting" a coil means generating a closed electrical path between part of all coils in the electric motor. The short-circuited coils can form one or more closed loops. When the surrounding magnetic field changes (e.g., caused by a rotation of a rotor having magnets relative to a stator having the coils, such as an unauthorized user attempting to rotate a wheel driven by the electric motor), an electric current is generated or induced in the short-circuited coils. The induced electric currents formed in the closed loops generate an induced, opposing magnetic field (and heat). The induced magnetic field results in a force that opposes the movement of the rotor. As a result, the induced force/torque can prevent or at least impede (e.g., slow down) the unauthorized action (e.g., rotation).

When an unauthorized action creates a greater magnetic field change (e.g., to rotate the motor faster), the present system can respond with a greater induced force/torque to impede or restrain the unauthorized action. For example, when an unauthorized user slowly rotates a wheel driven by the electric motor of the present system, the unauthorized user may still be able to rotate the wheel; however, he/she can "feel" an induced torque, in a direction opposite the moving direction, generated by the present system to "slow" him/her down. When the unauthorized user increases the rotational speed, the induced force/torque can escalate accordingly, which makes the unauthorized rotation more and more difficult. As a result, the "coil-based" or "motor-based" security mechanism or system that can effectively prevent, or at least impede, unauthorized activities of an electric motor having multiple sets of coils.

In some embodiments, the present security mechanism or system can be implemented in a system that includes an electric motor. In such embodiments, the present security mechanism can be used to impede an unauthorized rotation of a rotor of the electric motor. For example, the present security mechanism or system can be implemented in a powertrain assembly in a vehicle configured to drive/power the vehicle. In such embodiments, the power train assembly can include a motor having multiple sets of coils and a security unit or security component configured to short-circuit part or all of these coils (so as to activate the security mechanism). In some embodiments, the security unit can include a conductive plate and an actuator configured to move the conductive plate to short-circuit part or all of the coils (and accordingly create closed loops by the short-circuited coils). The vehicle described herein can be one-wheeled, two-wheeled or three wheeled. The vehicle can be a self-balancing electric vehicle such as a Segway. In some embodiments, the vehicle can be an electric hoverboard, an electric bicycle, vehicles based on EPAC (Electrically Power Assisted Cycles) standards, a moped, an electric scooter, an electric motorcycle or the like. The vehicle can also be a 4-wheeled vehicle like an electric car.

In some embodiments, the present security mechanism or system can be implemented in a hub apparatus or hub assembly configured to rotate a wheel of a vehicle (e.g., a bicycle, tricycle, etc.). The hub apparatus includes a rotor assembly, a shaft, and a stator assembly. The stator assembly is fixedly coupled to the shaft, and the shaft extends through the rotor assembly. The rotor assembly can be rotated relative to the stator assembly and the shaft. The rotor assembly of the hub apparatus is coupled to the wheel/rim of the vehicle, and the shaft is fixedly coupled to the vehicle (e.g., to a vehicular structure such as a frame). The hub apparatus is configured to rotate the wheel either with or without human power to move (or at least facilitate the movement of) the vehicle. In some embodiments, the electric motor can include magnets in the rotor assembly and coils in a stator assembly. In other embodiments, the magnets can be positioned in the stator assembly, whereas the coils can be positioned in the rotor assembly. In some embodiments, the electric motor can be powered by a battery, a battery assembly, or other suitable energy storage devices. In some embodiments, the hub apparatus as a whole can be considered as an electric motor. The disclosed security mechanism can effectively prevent, or at least impede, an unauthorized rotation of the hub apparatus.

In some embodiments, the present technology can be implemented in a vehicle driven by the foregoing hub apparatus. The present technology is also directed to a security, locking and/or braking mechanism that can generate torque or rotational force (e.g., by a change in magnetic fields caused by electric current induced in part or all coils of a stator) to counter an unauthorized action.

In some embodiments, the present security, locking, braking mechanism can be used to prevent or impede the rotation of various types of rotating devices (e.g., a rotor, a wheel, a rotating component of an electric motor, etc.). In some embodiments, the security, locking, and/or braking mechanism can be implemented in any apparatus that has suitable coils and circuities. In some embodiments, the security, locking, and/or braking mechanism can be used as a theft-prevention mechanism.

The present technology also discloses a (physical) locking device that can cooperate with the foregoing coil-based security mechanism (e.g., to enhance security). The present locking device can be installed in a hub apparatus (or an electric motor) and configured to stop or at least partially restrain/prevent a rotating portion (e.g., a rotor/rotor assembly) of the hub apparatus from rotating relative to a stationary portion (e.g., a stator/stator assembly) of the hub apparatus. In some embodiments, the locking device can include a stopper (e.g., positioned at the stator) configured to contact a corresponding stopping bump (e.g., positioned at the rotor) so as to at least partially prevent the rotation of the rotor. Embodiments of such locking devices are discussed in detail with reference to FIGS. 4a-4c. In some embodiments, the locking device can be implemented in a hub apparatus without the coil-based security mechanism.

FIG. 1a is a block diagram illustrating a system 900 in accordance with embodiments of the present technology. In some embodiments, the system 900 can be implemented in a vehicle with a wheel driven by an electric motor (e.g., the motor 901 in FIG. 1a). In some embodiments, the system 900 can be implemented in a powertrain assembly for driving a vehicle (e.g., the motor 901 is configured to drive the wheel via one or more power transmission components such as a belt, chain, gear, etc.). In some embodiments, the system 900 can be implemented in a hub apparatus having a motor therein. In some embodiments, the system 900 can be implemented in any suitable device that includes an electric motor having multiple set of coils.

As shown in FIG. 1a, the system 900 includes a motor 901, an electric control unit (ECU) or controller 902 configured to control the motor 901, and a power supply 903 configured to power the motor 901. The motor 901 includes a stator (or stator assembly) and a rotor (or rotor assembly) configured to rotate relative to the stator. The motor 901 includes multiple sets of coils, located either in the stator or the rotor. In the embodiments where the coils are in the stator, the rotor can include multiple magnets configured to rotate relative to the stator. In the embodiments where the magnets are in the stator, the rotor can include multiple coils configured to rotate relative to the rotor. The system 900 further includes a motor control unit (MCU) 904. The motor control unit 904 include a drive circuitry 905 and a circuit controller 906. The drive circuitry 905 includes multiple switches configured to supply currents to the motor 901 (e.g., via power lines X, Y, and Z, to be discussed in detail below). The circuit controller 906 is configured to control the switches in the drive circuitry 905 based on the instructions from the ECU 902 or default rules embedded in the circuit controller 906. In some embodiments, the ECU 902 can further communicate with or controlled by a portable device (e.g., a user's smartphone or wireless key-fob, etc.) via a wireless communication or via a dashboard disposed on the vehicle with I/O device configured to interact with the user.

In the illustrated embodiments, the motor 901 has three sets of coils, each set including a group of serially connected coils positioned 180-degree (or other degrees) apart around the stator. The three sets of coils can be circumferentially arranged or positioned (e.g., FIG. 3a) next to one another around the stator such that, when electric currents flow through these coils, the coils generate magnetic fields to rotate multiple magnets in the generated magnetic fields. For example, in the embodiments where the coils are arranged in the stator, the magnets in the rotor can be rotated by the induced magnetic fields generated by the coils.

The drive circuitry 905 is configured to provide currents to the coils. The drive circuitry 905 is configured to receive a direct electric current (DC) from the power supply 903 (e.g., a battery, a capacitor, an energy storage device, etc.) and then forms an alternating current (AC) in various phases. In the illustrated embodiments, the drive circuitry 905 is configured to receive a DC voltage and form an alternating current with three phases (e.g., any two of the phases have a 120-degree difference). The three-phase AC can be supplied to the three sets of coils in the motor 901, respectively. By this arrangement, the three-phase alternating current in the three sets of coils result in a continuous, alternating magnetic field change so as to drive the motor 901 (e.g., by rotating the corresponding magnets). As shown in FIG. 1a, the three-phase alternating current is supplied to the three sets of coils via three-phase power lines X, Y and Z, respectively.

The security unit 907 is configured to selectively short the wires of the coils (e.g., to short/connect part or all of the three-phase power lines X, Y and Z, such that corresponding part or all of the three sets of coils can be short-circuited). In one embodiment, the security unit 907 is controlled by the ECU 902. When part or all of the three-phase power lines X, Y and Z are connected with one another, the corresponding one(s) of the three sets of coils is(are) short-circuited. A short-circuited coil set forms a closed loop. In other words, any induced current in the short-circuited coil does not flow out of the loop. Instead, it flows in the loop and accordingly generates an induced magnetic field. When an unauthorized user attempts to rotate a wheel attached to the rotor of the motor (e.g., by pushing the vehicle to rotate its wheel), the induced magnetic field can form a torque to counter or impede the unauthorized rotation. By this arrangement, the system 900 provides an effective security mechanism to prevent or impede unauthorized actions such as theft.

In some embodiments, the security unit 907 can include a conductive plate 111 (FIG. 1*b*) and an actuator configured to move the conductive plate 111 to short-circuit the coils (and accordingly create closed loops by the short-circuited coils). In other embodiments, the security unit 907 can include a switch to short-circuit the coils. In some embodiments, the switch can be a physical, mechanical, or electromechanical switch. In other embodiments, the switch can be a transistor-based switch such as a metal-oxide-semiconductor-field-effect-transistor (MOSFET) switch.

In some embodiments, when the motor 901 is turned off (e.g., power off), the ECU 902 can immediately instruct the security unit 907 to short-circuit the coils in the motor 901. In other embodiments, the ECU 902 can instruct the security unit 907 to short-circuit the coils in the motor 901 after the motor 901 has been turned off for a predetermined time period (e.g., 5-10 minutes). Yet in some other embodiments, the ECU 902 can instruct the security unit 907 to short-circuit the coils in the motor 901 after the system 900 (i.e., the vehicle) is left "unused" (e.g., the vehicle does not receive a user input or a user instruction to operate) for a predetermined period of time.

In some embodiments, after the ECU 902 instructs the security unit 907 to short-circuit the coils in the motor 901, the ECU 902 can further verify whether these coils are short-circuited. For example, the ECU 902 can (1) inform the circuit controller 906 of the MCU 904 that the coils are to be short-circuited; and (2) instruct the circuit controller 906 to send a testing signal (e.g., a relatively small amount of current, a pulse, a square wave, etc.) to the drive circuitry 905 to see if the coils have been short-circuited. In some embodiments, the circuit controller 906 can send a series of signals (e.g., pulses, waves, etc.) to the drive circuitry 905, and then to see if the coils have been short-circuited as expected. The testing methods are discussed below in detail with reference to FIG. 1*b*.

If the circuit controller 906 confirms that the coils are short-circuited (e.g., the testing signal are reflected as expected), the circuit controller 906 can (1) notify the ECU 902 about the confirmation (e.g., sending a confirmation signal); and (2) enter a hibernation mode (e.g., to preserve energy). After receiving the confirmation from the circuit controller 906, the ECU 902 can then hibernate (e.g., to preserve energy).

Figure 1B:
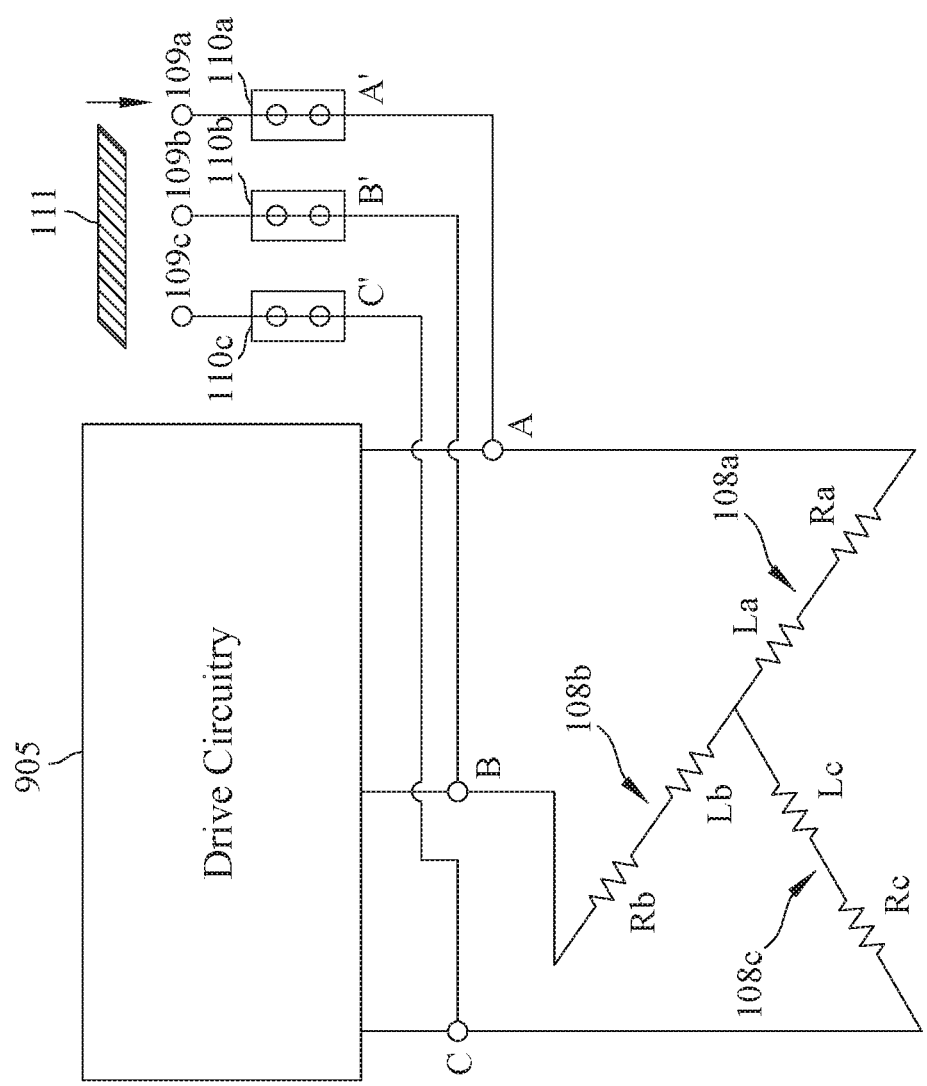
FIG. 1b is a schematic circuit diagram of a "coil-based" security mechanism or system in accordance with embodiments of the present technology.

FIG. 1*b* is a schematic circuit diagram of a "coil-based" security mechanism in accordance with embodiments of the present technology. As shown in FIG. 1*b*, "La, Ra", "Lb, Rb" and "Lc, Rc" represent the equivalent impedances (e.g., combinations of inductances and resistances) of the three coils (or sets of coils) of the motor 901, respectively (e.g., coils 108*a*, 108*b* and 108*c* shown in FIG. 1*b*). As shown, the coils 108*a*, 108*b* and 108*c* are coupled to the drive circuitry 905. The drive circuitry 905 is configured to control the coils 108*a*, 108*b* and 108*c* by supplying a three-phase alternating current (AC) (e.g., with a 120-degree difference between two phases) thereto. The three-phase AC is converted from a direct current (DC) source such as a battery. Embodiments of the three-phase AC are discussed below with reference to FIG. 1*c*-1*i*.

As shown in FIG. 1*b*, the connectors 109*a*, 109*b* and 109*c* can be coupled to contacting points A, B, and C. By this arrangement, when the conductive plate 111 of the security unit 907 contacts the connectors 109*a*, 109*b* and 109*c*, the coils 108*a*, 108*b* and 108*c* are short-circuited as described above.

In some embodiments, relays 110*a*, 110*b*, and 110*c* can be positioned between the connectors 109*a*, 109*b* and 109*c* and contacting points A, B, and C, respectively (in FIG. 1*b*, points A', B', and C' represent contacting points with same voltages as points A, B, and C, respectively). The relays 110*a*, 110*b*, and 110*c* can act as a safety fuse to the coils 108*a*, 108*b* and 108*c*. For example, if the current in one of the short-circuited coils 108*a*, 108*b* and 108*c* exceeds a certain threshold or the temperature of a coil exceeds a limit as measured by a temperature sensor adjacent to coil (not shown), the corresponding one of the relays 110*a*, 110*b*, and 110*c* can form an open circuit so as to prevent the short-circuited coils 108*a*, 108*b* and 108*c* from over-heating or melting down. In some embodiment, the relays 110*a*, 110*b*, and 110*c* can be "recovered," or be set back to form a closed circuit, (1) after a predetermined amount of time, or (2) in response to detecting that the current in one of the short-circuited coils 108*a*, 108*b* and 108*c* is no longer exceeding the threshold.

As discussed above, in some embodiments, after the conductive plate 111 short-circuits the coils 108*a*, 108*b* and 108*c* (e.g., the conductive plate 111 is moved by an actuator (not shown) to contact the connectors 109*a*, 109*b* and 109*c*), the ECU 902 can further verify whether these coils 108*a*, 108*b* and 108*c* are short-circuited. For example, referring to both FIGS. 1*a* and 1*b*, the ECU 902 can (1) send a signal to the circuit controller 906 indicating that the conductive plate 111 has been actuated in order; and (2) instruct the circuit controller 906 to send a testing signal (e.g., a relatively small amount of current, a pulse, a square wave, etc.) to see if the coils 108*a*, 108*b* and 108*c* have been short-circuited. For example, the circuit controller 906 can generate a testing wave/pulse/signal/current and send it to the drive circuitry 905 at contacting point A. The circuit controller 906 then measure the signal at contacting points B and/or C. Based on the characteristics (e.g., strength, form, shape, etc.) of the detected signal wave/pulse/current, the circuit controller 906 can determine whether the coils 108*a*, 108*b* and 108*c* are short-circuited. For example, if the wave went through part or all of the coils 108*a*, 108*b* and 108*c*, the characteristics of the wave would be changed due to the impendence of these coils 108*a*, 108*b* and 108*c*. By comparing the original testing signal (at one point, for example, contacting point A) and the detected wave (at another point, for example, contacting point B or C), the circuit controller 906 can determine whether the coils 108*a*, 108*b* and 108*c* are short-circuited as expected. In some embodiments, when the original and detected testing signals are substantially similar or generally the same (e.g., strength, wave form, etc.), the system 900 can confirm that the coils are short-circuited as expected. The circuit controller 906 can then transmit a signal indicating the testing result to the ECU 902.

In some embodiments, the testing result can be analyzed in various ways depending on the types of the testing signals and corresponding measuring schemes. For example, in some embodiments where the contacting points A, B and C are short-circuited by the conductive plate 111 and the testing signal is a small amount of current, if the coils are short-circuited as expected, the amount of the current measured/sensed at the contacting point B or C should be similar to the amount of the original testing current applied to the contacting point A.

In some embodiments, if the circuit controller 906 cannot confirm that the coils are short-circuited, the circuit controller 906 can notify the ECU 902 about the failure of confirmation. The ECU 902 can then (1) run a test to check if the security unit 907 functions properly, and/or (2) notify a user of the system 900 about the failure of confirmation. In some embodiments, after the ECU 902 notifies the user (e.g., by sending a message to the user's smartphone or a display disposed on the vehicle where the system 900 is implemented), the ECU 902 can go hibernate (or enter a hibernation or sleep mode). Since the mechanism of short-circuiting the coils of the motor has a relatively simple structure/arrangement (e.g., by using switches and the conductive plate 111), the mechanism is reliable. If the controller does not receive the confirmation, it can be caused by malfunction of the motor itself. As a result, the controller (and the circuit controller also) is configured to enter the hibernation mode to prevent further damages caused by a possible malfunction resulting in the failure of confirmation. Similarly, the circuit controller 906 can go hibernate for the same reason after notifying the ECU 902 about the failure of confirmation.

In some embodiments, the ECU 902 can determine that the circuit controller 906 may not function properly if the circuit controller 906 cannot confirm that the coils are short-circuited after a predetermined time period (e.g., from the time that the ECU 902 instructs the circuit controller 906 to send a testing signal). In such embodiments, the ECU 902 (and the circuit controller 906) can also enter a hibernation mode.

In some embodiments, when the ECU 902 determines that the circuit controller 906 fails to confirm the connection status of the coils (e.g., short-circuited or not short-circuited), the ECU 902 can send a notification to a user and then go hibernate. In some embodiments, the ECU 902 can instruct a physical locking device (e.g., locking device 400 discussed below with reference to FIG. 4a) to lock the system 900 if the confirmation is not successfully received.

In some embodiments, when a user turns on the power of the system 900 (e.g., the ECU 902 receives a wireless signal from a key fob or mobile phone, or a signal generated response to pressing a physical button of a hub apparatus (a button to activate the hub apparatus), the ECU 902 instructs the security unit 907 to let the coils of the motor 901 (electrically and physically) couple to the drive circuitry 905 and the power supply 903 (e.g., not short-circuited or closed-circuited). The ECU 902 then instructs the circuit controller 906 to send a testing signal to see if the coils are properly, electrically coupled to the power supply 903 (without being short-circuited). If so, the motor 901 remains turned on and is ready for receiving power from the drive circuitry 905 and the power supply 903. If not, the circuit controller 906 notifies the ECU 902 about the confirmation that the coils are still short-circuited, and then both the ECU 902 and the circuit controller 906 can go hibernate. In some embodiments, the drive circuitry 905 can include small resistors (not shown) in line with the leads/wires that feed the coils. The circuit controller 906 can detect voltage across the resistors to detect the signals on each lead and therefore determine if the coils are short-circuited.

In some embodiments, when the ECU 902 determines that the circuit controller 906 fails to confirm the connection status of the coils (e.g., short-circuited or not short-circuited), the ECU 902 can send a notification to a user and then go hibernate. In some embodiments, the ECU 902 can instruct a physical locking device (e.g., element 400 discussed below with reference to FIG. 4a) to lock the system 900.

Figure 1C:
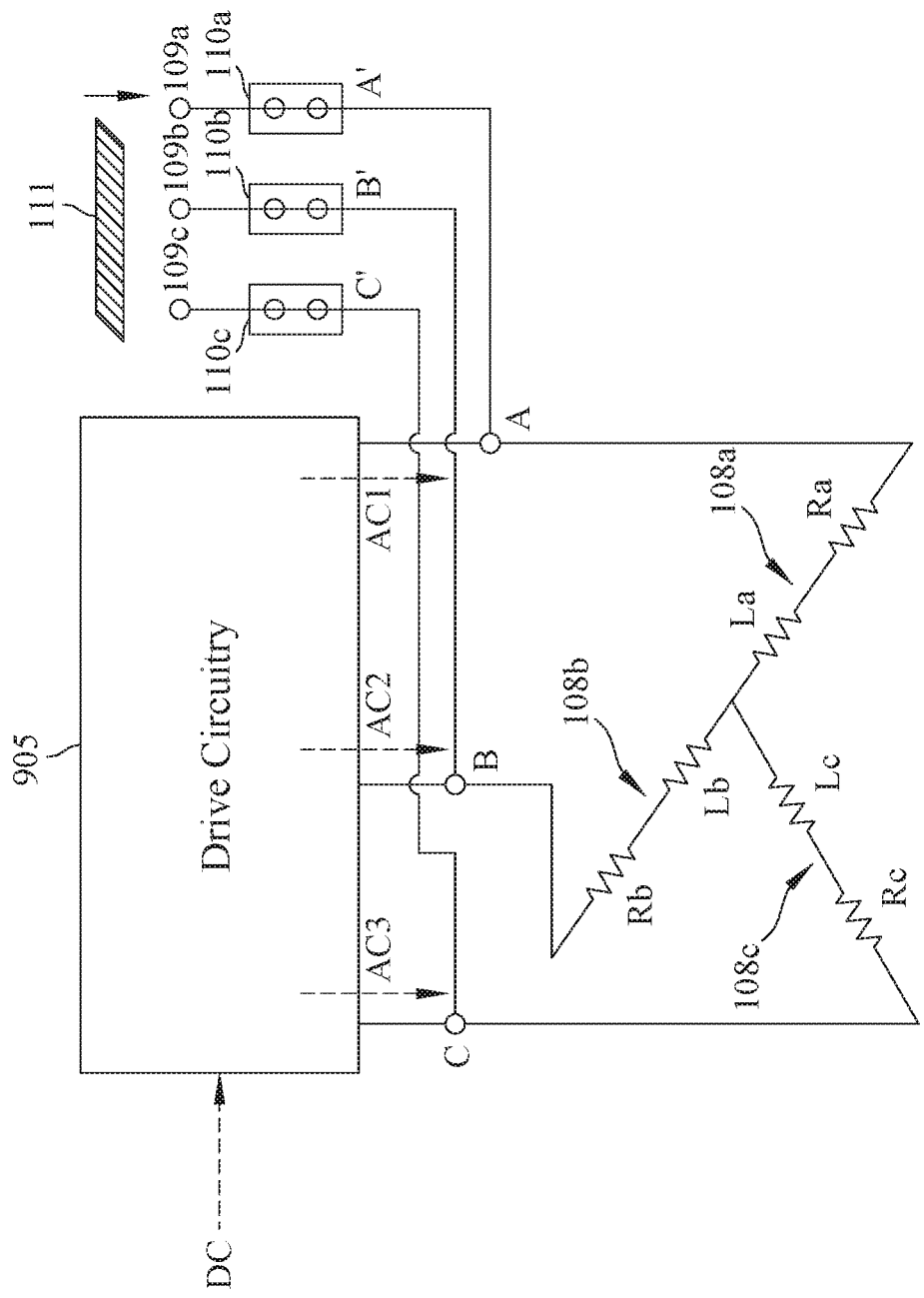
FIG. 1c is a schematic circuit diagram, illustrating drive circuitry in accordance with embodiments of the present technology for converting a direct current (DC) to three-phase alternating currents (AC).

Referring to FIG. 1c, as discussed above, the drive circuitry 905 can convert a direct circuit (DC) into three-phase alternating currents (AC1, AC2, and AC3). As shown in FIGS. 1d-1i, the three-phase alternating currents AC1, AC2, and AC3 can flow through various combinations of the coils 108a, 108b and 108c, resulting in changes of magnetic fields, which rotates the rotor of the motor 901. FIGS. 1d-1i illustrate how the current flows in the coils in a rotation cycle (360 degrees).

Figure 1D:
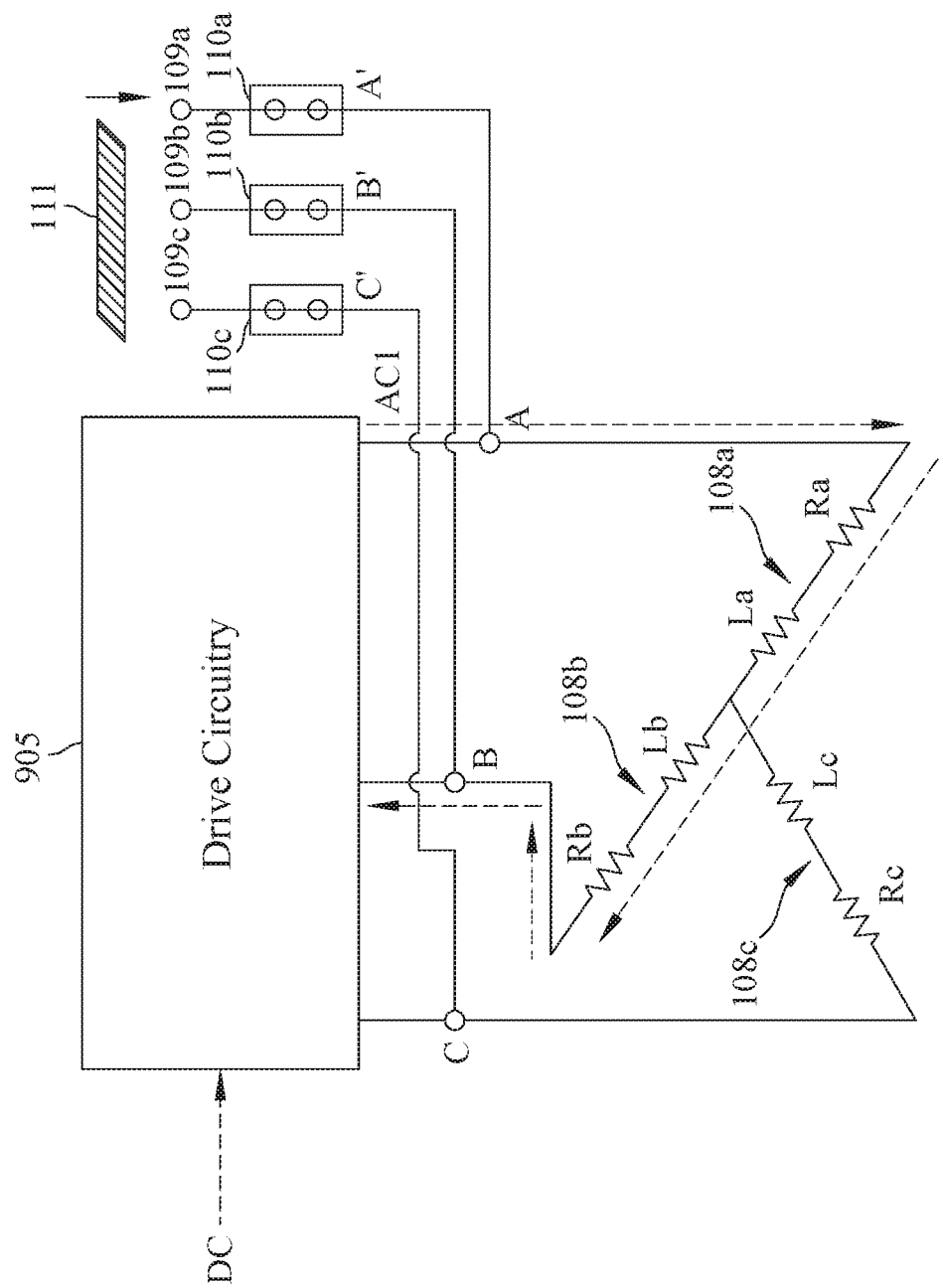
FIGS. 1d-1i are schematic circuit diagrams, illustrating three-phase alternating currents (AC) generated by the drive circuitry in various angles.
Figure 1E:
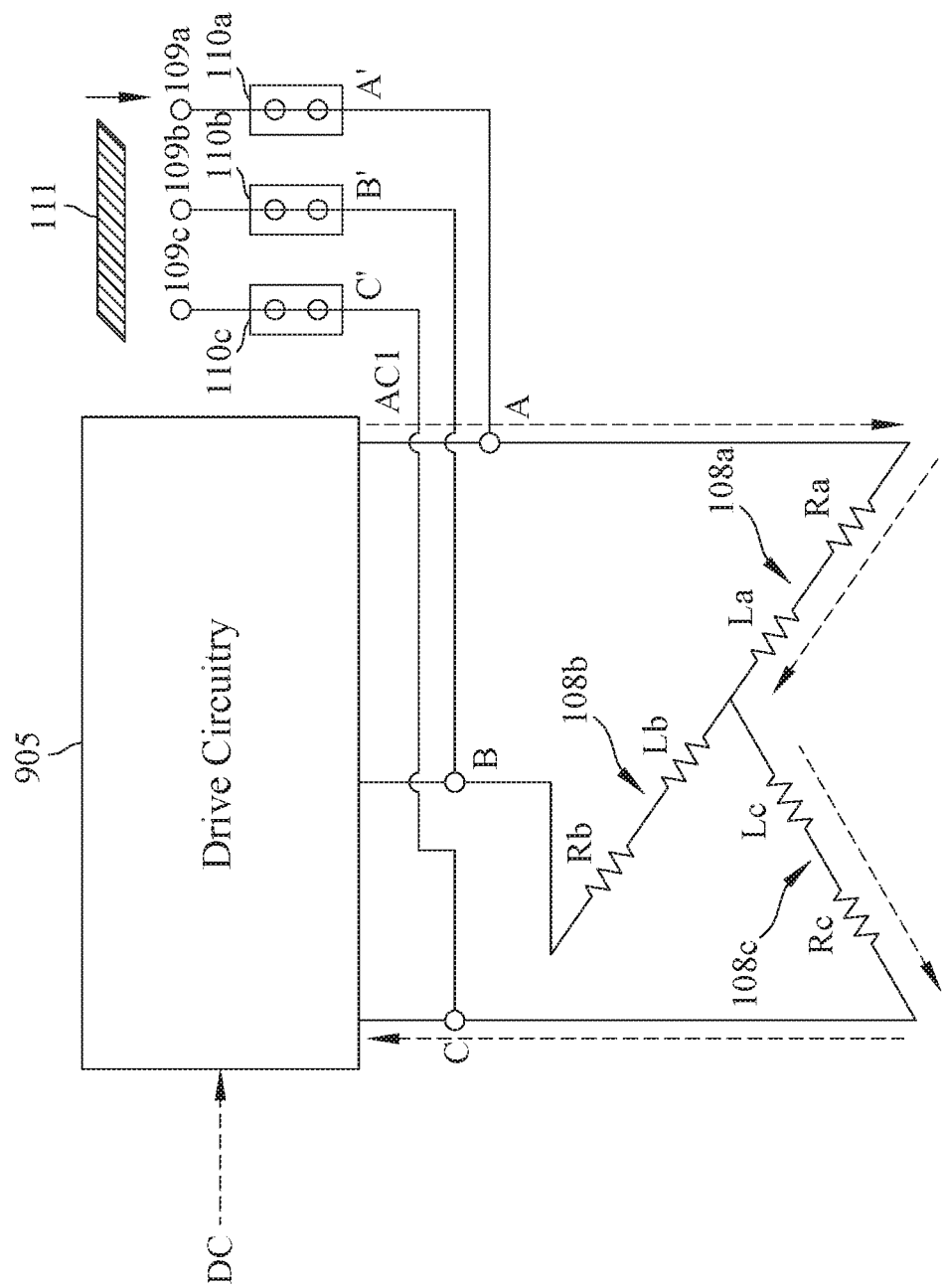

FIG. 1d shows that alternating current AC1 starts at the contacting point A, flows through coils 108a and 108b, and returns to the contacting point B. In this phase, the rotor rotates from 0 to 60 degrees. FIG. 1e shows that alternating current AC1 starts at the contacting point A, flows through coils 108a and 108c, and returns to the contacting point C. In this phase, the rotor rotates from 60 to 120 degrees. FIGS. 1d and 1e show a first phase of the three-phase AC.

Figure 1F:
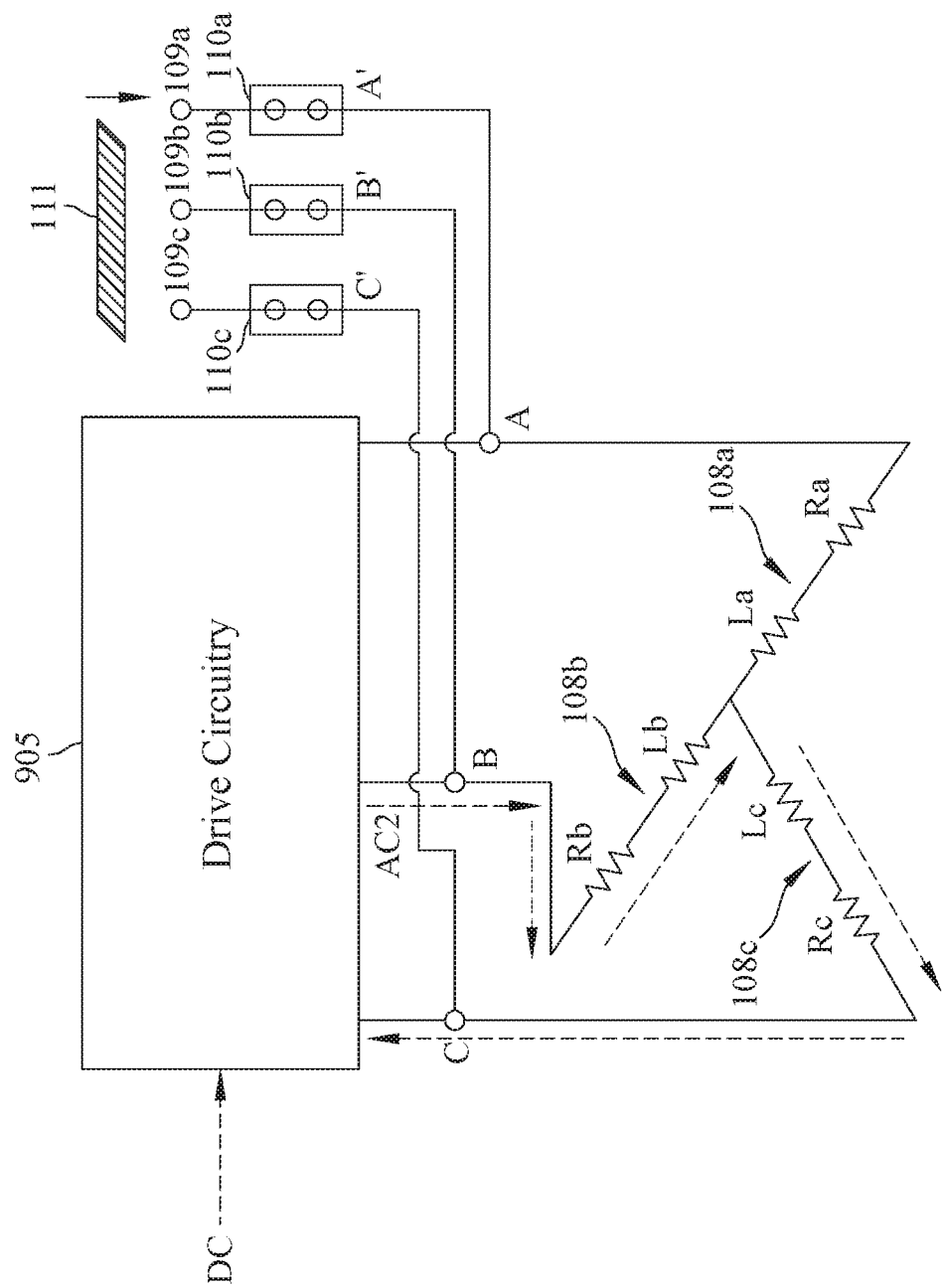
Figure 1G:
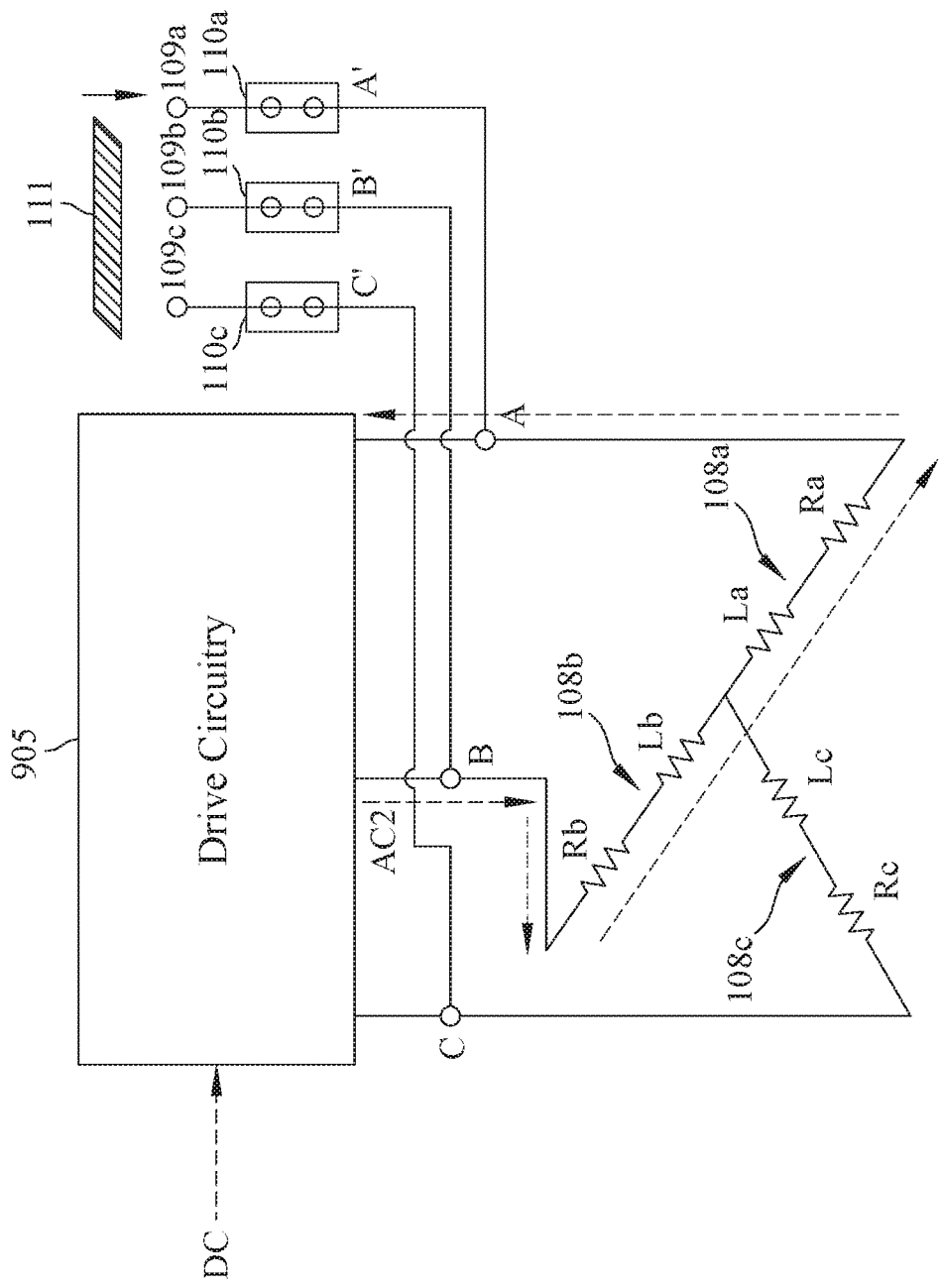

FIG. 1f shows that alternating current AC2 starts at the contacting point B, flows through coils 108b and 108c, and returns to the contacting point C. In this phase, the rotor rotates from 120 to 180 degrees. FIG. 1g shows that alternating current AC2 starts at the contacting point B, flows through coils 108b and 108a, and returns to the contacting point A. In this phase, the rotor rotates from 180 to 240 degrees. FIGS. 1f and 1g show a second phase of the three-phase AC.

Figure 1H:
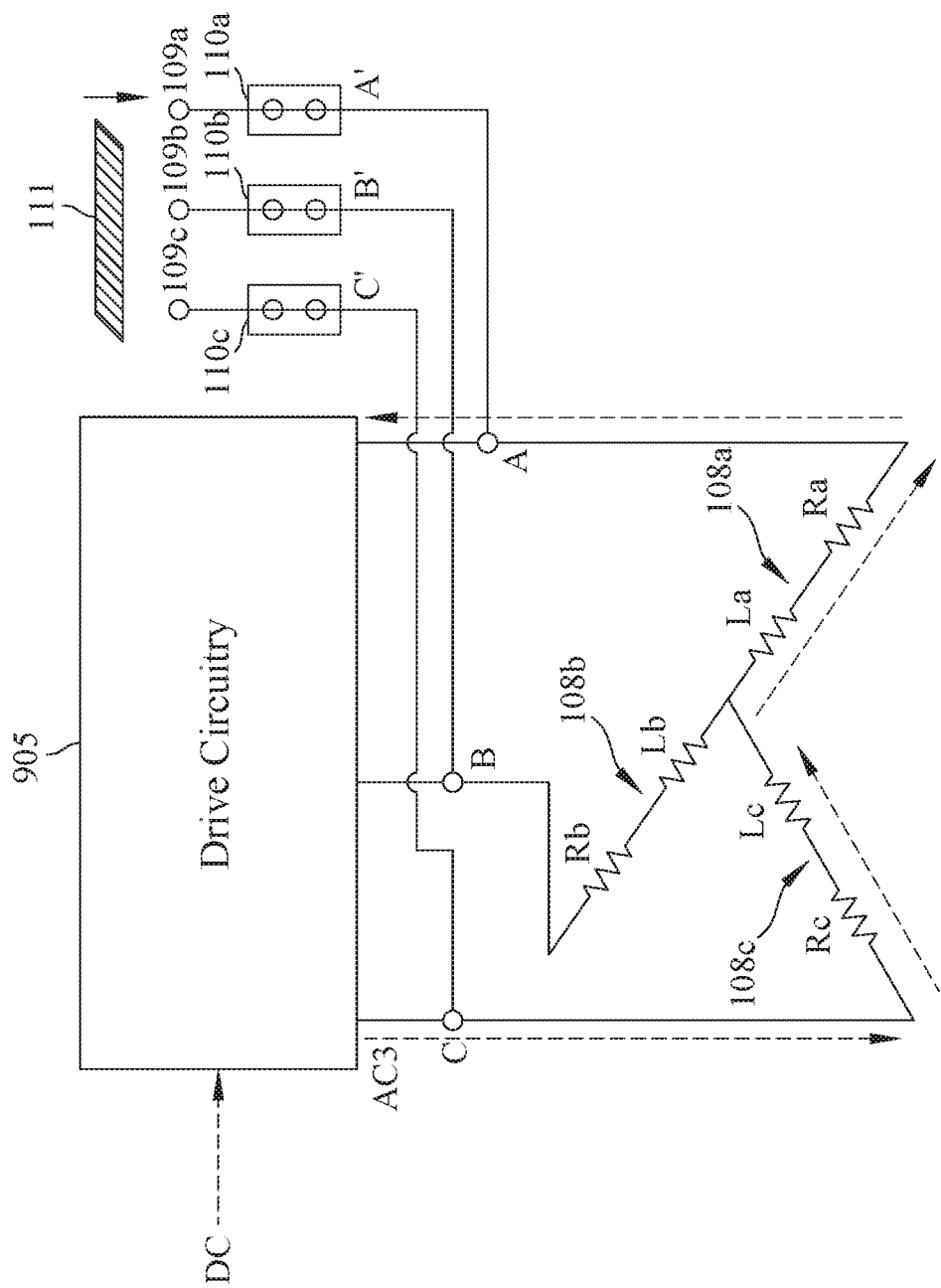
Figure 1I:
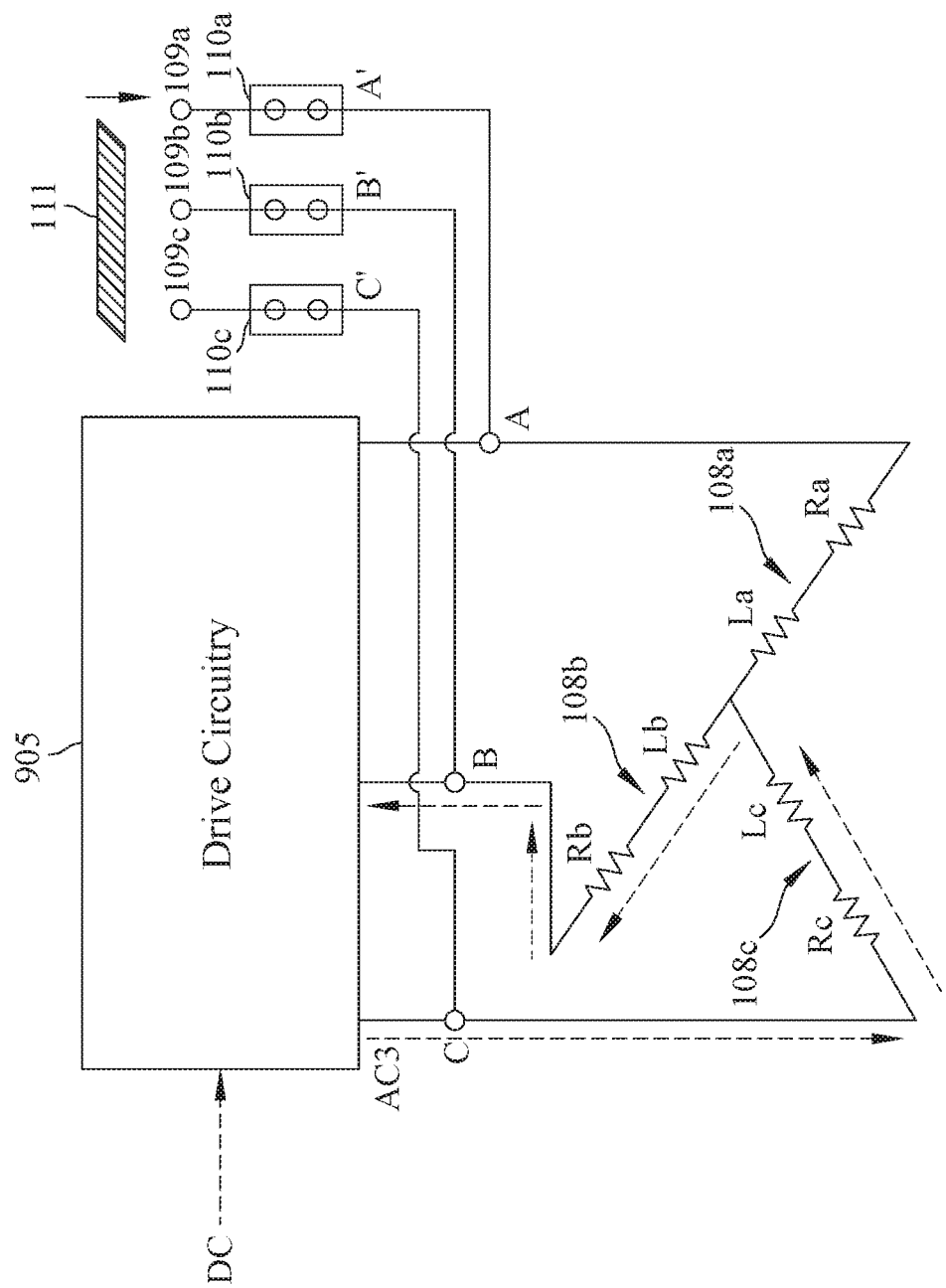

FIG. 1h shows that alternating current AC3 starts at the contacting point C, flows through coils 108c and 108a, and returns to the contacting point A. In this phase, the rotor rotates from 240 to 300 degrees. FIG. 1i shows that alternating current AC3 starts at the contacting point C, flows through coils 108c and 108b, and returns to the contacting point B. In this phase, the rotor rotates from 300 to 360 degrees. FIGS. 1h and 1i show a third phase of the three-phase AC.

Figure 2A:
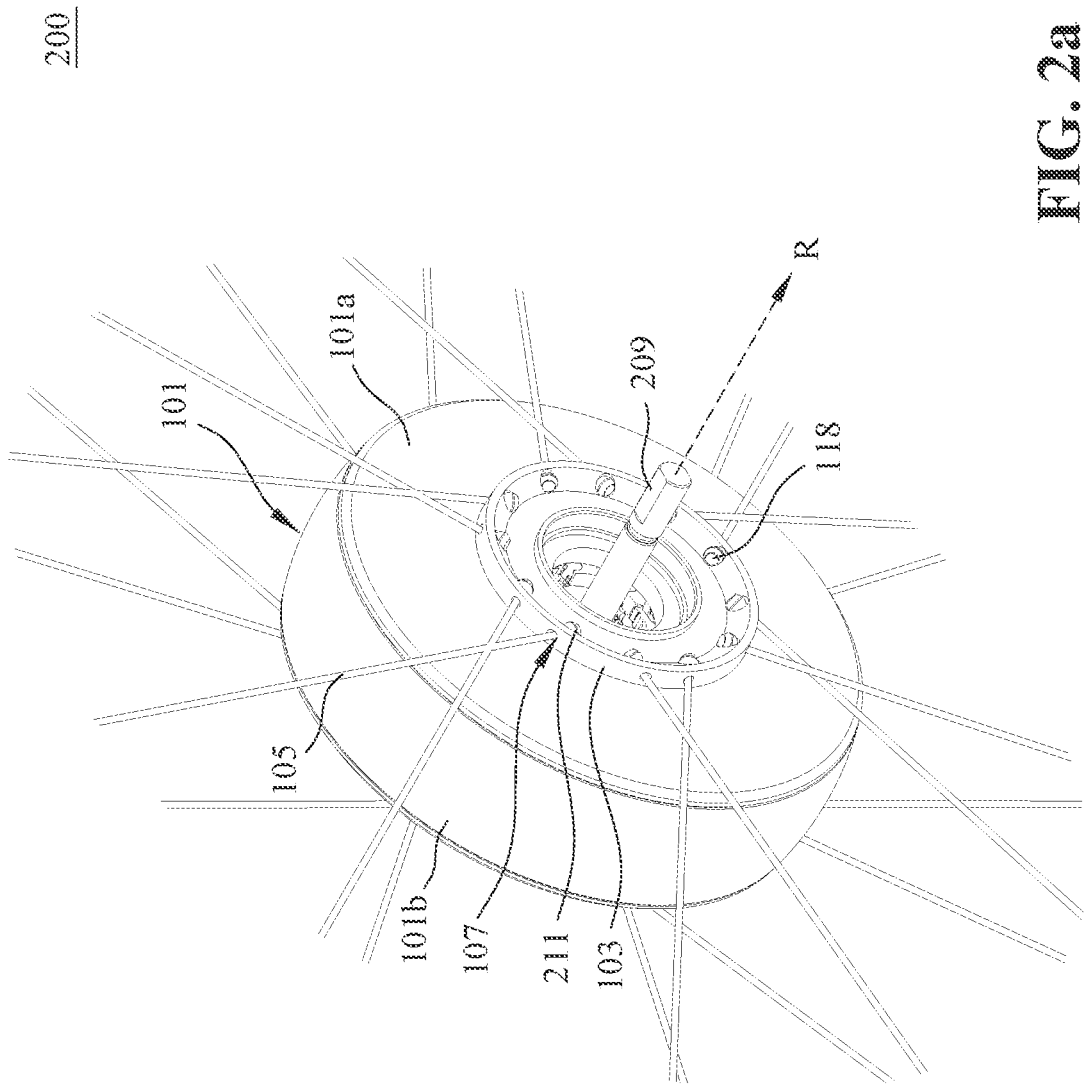
FIGS. 2a-2c illustrate various components of a hub apparatus in accordance with embodiments of the present technology.
Figure 2B:
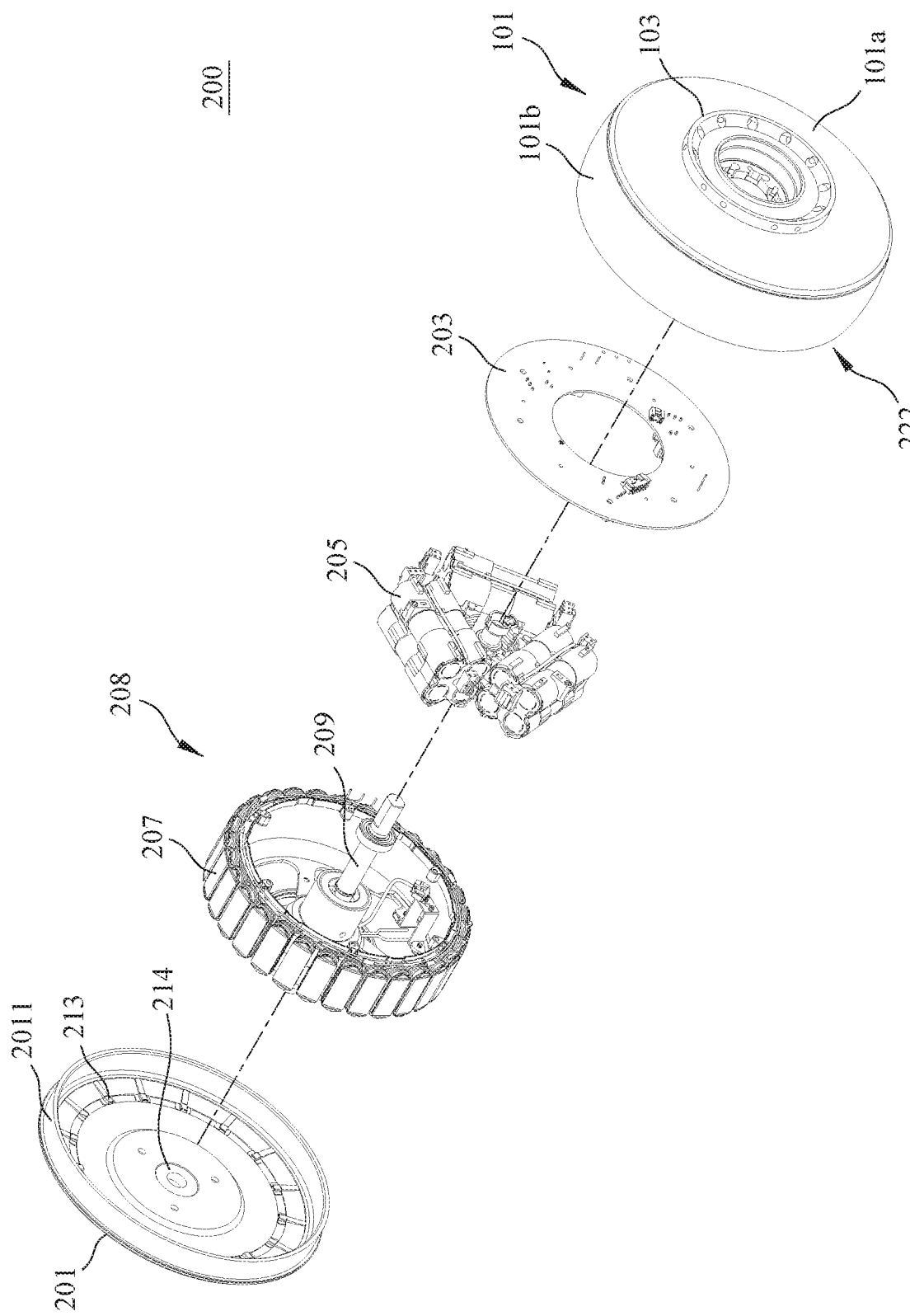
Figure 2C:
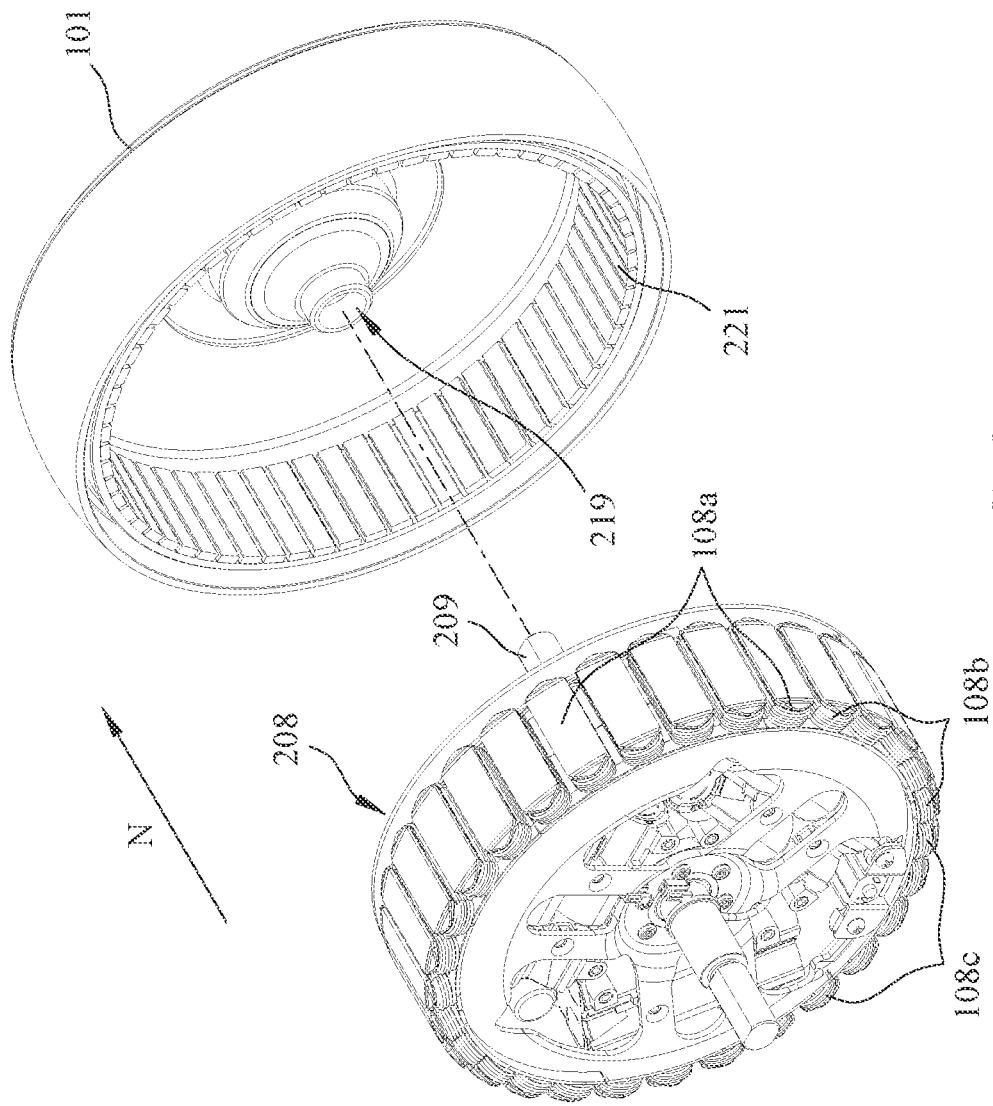

FIGS. 2a-2c illustrate various components of a hub apparatus 200 in accordance with embodiments of the present technology. As previously described, the system 900 can be implemented in a hub apparatus that powers a vehicle. As shown in FIG. 2a, a hub apparatus 200 includes a housing 101 and a hub flange (or ring structure) 103 extending from the housing 101 and configured to accommodate multiple spokes 105 (e.g., the other end of the spoke 105 can be coupled to a front/back wheel of a bike).

In some embodiments, the housing 101 can be assembled from multiple housing components. In some embodiments, the housing 101 can include a first housing component and a second housing component coupled to each other and together form an inner/interior/internal space to accommodate elements of the hub apparatus 200. In some embodiments, for example, the housing 101 can include a sidewall 101a and an outer rim 101b extending around the outer circumference of the sidewall 101a. The outer rim 101b has a height or a depth that defines the interior space in the housing 101.

As shown in FIG. 2a, the sidewall 101a is formed with a side opening at its center, allowing a shaft 209 to pass through. The opening is configured to accommodate a side cover 502 (see e.g., FIG. 5). The side cover 502 is configured to rotate with the housing 101 relative to the shaft 209. In some embodiments, a bearing (not shown) can be positioned between the side cover and the shaft 209, which enables the side cover 502 to rotate relative to the shaft 209.

As best shown in FIG. 2b, fitted into the interior space of the housing 101 are a main circuit board 203, a battery assembly 205, and a coil assembly 207 that are fixedly directly or indirectly to an axle or shaft 209 passing through the center of the hub apparatus 200. In such embodiments, the housing 101 and a number of magnets (not visible in FIG. 2a or 2b; see e.g., FIG. 2c) on the interior of the housing 101 together form a rotor assembly 222. Further, the main circuit board 203, the battery assembly 205, and the coil assembly 207 together can be considered as the stator assembly 208.

When an electric current provided by the battery pack (e.g., the battery assembly 205) passes through coils of the stator assembly 208, magnetic fields are generated and accordingly move the magnets of the rotor assembly 222 to rotate the rotor assembly 222 about axis R (or shaft 209). In some embodiments, the battery pack can be positioned external to the hub apparatus 200. As a result, the housing 101 and a wheel attached to the housing 101 via the spokes 105 are also rotated to move a scooter, a bicycle, or a vehicle.

In the illustrated embodiment, the hub flange or ring structure 103 (FIG. 2a) and the sidewall 101a are concentrically positioned. The hub flange or ring structure 103 is positioned around a center point of the sidewall 101a. In other embodiments, the hub flange or ring structure 103 can have different dimensions (e.g., closer to the outer edge of the housing 101 or nearer to the center point). As shown, the hub flange or ring structure 103 includes a plurality of openings 107 configured to receive the ends of the multiple spokes 105, respectively.

Each spoke 105 has an outer end configured to couple to a wheel/rim structure (not visible in FIG. 2a) and an inner, flared (or spherical) end 211 that seats against a correspondingly shaped recess formed in an interior circumference of the hub flange or ring structure 103. In one embodiment, a spherical washer 118 is fitted over the spoke 105 and rests against the flared end 211 of the spoke 105. Correspondingly shaped spherical recesses are formed in the hub flange or ring structure 103 to receive the spherical washer 118 and seat the spoke 105 under tension.

In addition, because the spherical washer 118 allows the spoke 105 to be in contact with the hub flange or ring structure 103 at various angles, the present structure (1) improves manufacturing flexibility (e.g., they are easy to fit and have a higher error tolerance) and (2) provides additional durability when operating the hub apparatus 200 at least because the spokes 105 are not rigidly secured to the hub flange or ring structure 103 at their ends.

FIG. 2b is an exploded view showing the hub apparatus 200 in accordance with embodiments of the present technology. The hub apparatus 200 includes the housing 101 (which has the sidewall 101a and the outer rim 101b) and the lid or cap 201. On its outer surface, the housing 101 includes the hub flange or ring structure 103 configured to couple to a wheel/rim structure via multiple spokes. On its inner surface, the lid 201 includes multiple protrusions or stopping bumps 213 configured to stop the relative rotation (e.g., by cooperating with a motor locking device 400 discussed below with reference to FIGS. 4a-4c) between the housing 101 and the stator assembly 208. The multiple protrusions or stopping bumps 213 can be named as "engaging portions."

In some embodiments, the engaging portion can be implemented as a recess (e.g., configured to receive the motor locking device 400), a hook (e.g., configured to engage the lock the motor locking device 400), and other suitable components. In some embodiments, the engaging portions are located either on the interior surface of either the sidewall 101a of the housing 101, and/or on the interior surface of the lid 201. The engaging portion and the motor locking device 400 together form a "locking mechanism" for the hub apparatus 200.

In the illustrated embodiment, a support structure (or a chassis) formed as a spoked wheel (e.g., made of aluminum or other metal) is hollow in the interior and includes a flat rim opening, which multiple "oval-shaped" coils 108 are placed. Multiple magnets 221 (see e.g., FIG. 2c) are circumferentially positioned on the inner surface of the outer rim 101b, and accordingly the housing 101 and the magnets 221 together act as a "rotor assembly" or a rotor in this embodiment.

The main circuit board 203 is configured to carry one or more controllers, controlling circuits, logic, sensors, wiring, and/or other suitable components necessary to apply current to the coils and to rotate the housing 101. In some embodiments, the main circuit board 203 can carry an electrical control unit (ECU) of a vehicle (e.g., the ECU 902). In some embodiments, the main circuit board 203 can carry a power controller (e.g., a motor control unit, MCU 904, not shown in FIG. 2b) configured to control the power output of the hub apparatus 200. The power output can be measured in form of a measured torque force of rotation between the rotor assembly 222 (the housing 101 with the magnets 221 positioned therein or on its inner surface) and the stator assembly 208 or by the watts expended by the motor. In some embodiments, the main circuit board 203 can carry drive circuitry (e.g., the drive circuitry 905) configured to manage the power from a battery assembly 205 (e.g., to supply a three-phase alternating current). In some embodiments, the drive circuitry and the power controller can be integrated in one component (e.g., MCU).

The battery assembly 205 can include multiple battery packs. In the illustrated embodiments, the battery assembly 205 includes three battery packs laterally positioned adjacent to the main circuit board 203 in the interior space of the support wheel (or chassis). In other embodiments, the battery assembly 205 can have different numbers of battery packs arranged in various ways. In some embodiments, the battery assembly 205 can include three battery packs positioned at equal angles around the shaft 209 (e.g., to form a polygon such as a triangle, or different numbers of battery packs to form a rectangle, a pentagon, a hexagon, etc. in a reference plane generally perpendicular to the shaft 209). In some embodiments, the battery assembly 205 can be controlled or managed by a battery management system (BMS). The BMS can include one or more sensors configured to monitor the status of a battery. In some embodiments, the BMS can be positioned on the main circuit board 203. In some embodiments, the battery packs (and battery cells therein) can be connected in series or in parallel, depending on various needs or actual designs.

In some embodiments, the battery assembly 205 can be coupled to one or more battery memories positioned on the main circuit board 203 and configured to store battery-related information from a processor related to usage statistics (e.g., battery usage information, battery operating instructions (such as charging/discharging rates or other instructions that may vary from different batteries), battery firmware, battery status, etc.). In some embodiments, the battery memory can also be configured to store vehicle information (e.g., an operating temperature in the hub apparatus 200) or user information (e.g., driving/riding history, habits, etc.). In some embodiments, the battery memories can be positioned inside a battery housing of the battery assembly 205.

In some embodiments, the battery assembly 205 can be positioned inside the stator assembly 208 such that the hub apparatus 200 can have a compact design. Benefits of positioning the battery assembly 205 inside the stator assembly 208 include, for example, (1) the stator assembly 208 can protect the battery assembly 205, for example, from impacts from the outside; and (2) this arrangement can at least partially prevent the battery assembly 205 from interference/influence of the magnetic field generated by the magnets of the rotor assembly 222.

The main circuit board 203, the battery assembly 205, and the stator assembly 208 are fixedly coupled to the axle or shaft 209. The shaft 209 can be coupled to a vehicular body (e.g., a frame, a chassis, structural parts, etc.) and support the same. During operation, the housing 101 and the wheel attached thereto (via the spokes coupled to the hub flanges) can rotate relative to the shaft 209 to move the vehicular body. In some embodiments, the shaft 209 can be coupled to a front wheel component (e.g., a front wheel fork) or a rear wheel component (e.g., a rear wheel frame).

In some embodiments, the hub apparatus 200 can include one or more waterproof components (e.g., O-rings) configured to make the hub apparatus 200 waterproof. In some embodiments, the waterproof component can be positioned at one or more locations such as a location adjacent to the shaft 209, a location adjacent to other components of the hub apparatus 200, etc. In some embodiments, the waterproof component can also be positioned between the housing 101 and the lid 201, at one or both ends of the shaft 209, between a side cover and the housing 101 and the lid 201, etc. so as to enhance the overall waterproof capability of the hub apparatus 200.

As previously described, in the embodiment that the system 900 is implemented as or integrated with the hub apparatus 200, the stator assembly 208 and the rotor assembly 222 can be the stator and rotor of the motor 901, respectively. The power supply 903 can be the battery assembly 205. The MCU 904 and ECU 902 can be disposed on the main board 203. The security unit 907 can be fixed at a chassis (e.g. chassis 301 shown in FIG. 3*a*) of the stator assembly 208.

FIG. 2*c* illustrates how the stator assembly 208 is fitted within the housing 101. As shown, the stator assembly 208 is coupled to the shaft 209 and then the shaft 209 is positioned to pass through a center opening 219 of the housing 101 (in direction N, as indicated). As shown, multiple permanent magnets 221 are positioned on the interior or inner surface of (the sidewall or the rim of) the housing 101. During operation, the multiple permanent magnets 221 and the housing 101 can rotate (as a rotor) relative to the stator assembly 208.

As shown in FIG. 2*c*, the stator assembly 208 can include three sets of coils 108*a*, 108*b*, and 108*c*. In the illustrated embodiments, each set of coils includes two subsets of coils positioned opposite to each other around the hub assembly 200. As a result, the stator assembly 208 includes six subsets of coils positioned circumferentially around the shaft 209. The coils 108*a*, 108*b*, and 108*c* are configured to generate magnetic fields to rotate the magnets 221.

Figure 3A:
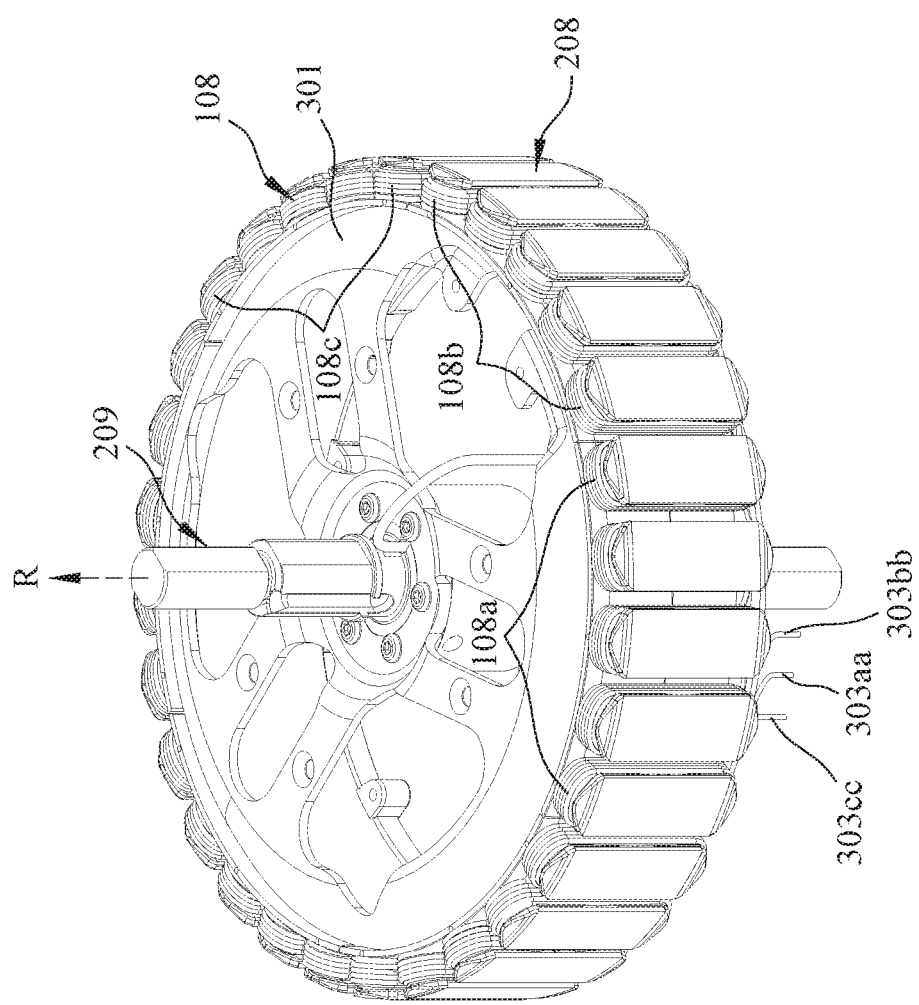
FIG. 3a illustrates a stator assembly in accordance with embodiments of the present technology.

FIG. 3*a* is a schematic diagram illustrating a stator assembly 208 in accordance with embodiments of the present technology. In the illustrated embodiments, the stator assembly 208 includes a number of coils 108 and a chassis 301 configured to be fixedly coupled to the shaft 209. In the embodiments shown in FIG. 3*a*, the coils 108 can include a first set of coils 108*a*, a second set of coils 108*b*, and a third set of coils 108*c*. The first set of coils 108*a* is configured to be coupled to the battery assembly 205 via a first wire 303*aa*. The second set of coils 108*b* is configured to be coupled to the battery assembly 205 via a second wire 303*bb*. The third set of coils 108*c* is configured to be coupled to the battery assembly 205 via a third wire 303*cc*. The first, second and third sets of coils 108*a*-108*c* are circumferentially positioned around the chassis 301 of the stator assembly 208 and are configured to receive (one phase of) a three-phase alternating current (AC) from the battery pack (e.g., via the drive circuitry 905, as discussed above).

Figure 3B:
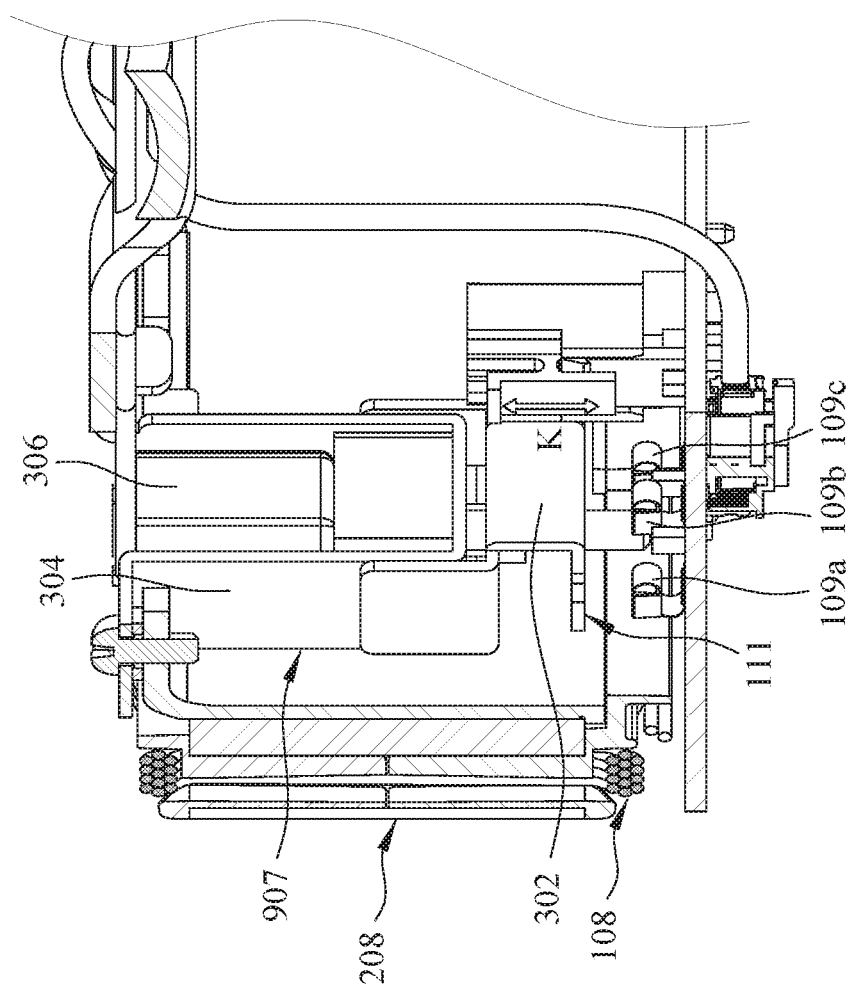
FIGS. 3b and 3c illustrate a coil-based security mechanism or system in accordance with embodiments of the present technology.
Figure 3C:
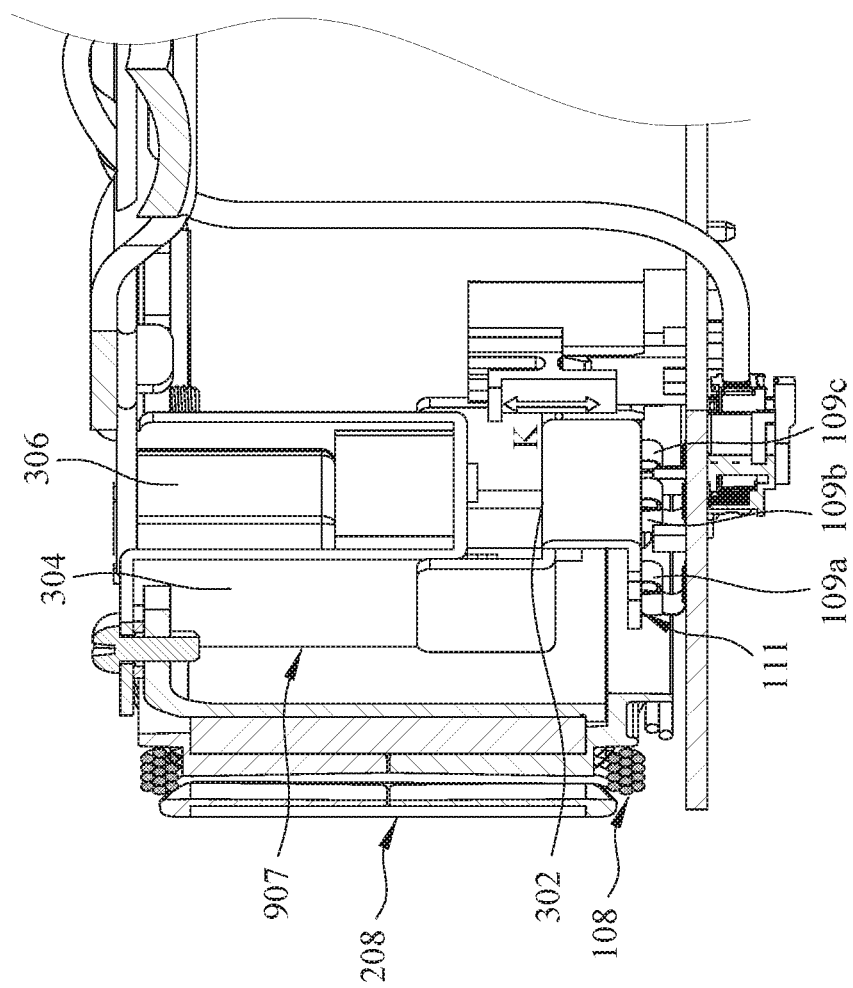

FIGS. 3*b* and 3*c* are partially schematic diagrams, illustrating a coil-based security mechanism having a security unit 907 in accordance with embodiments of the present technology. As shown in FIGS. 3*b* and 3*c*, the security unit 907 includes a stopper 302, a holder 304, and an actuator 306 configured to move the stopper 302 in direction K. In the illustrated embodiments, the holder 304 is coupled to the stator assembly 208. In the illustrated embodiments, three connectors 109*a*, 109*b* and 109*c* are respectively coupled to the three sets of coils 108*a*, 108*b* and 108*c*.

The conductive plate 111 is positioned on the bottom surface of the stopper 302. By this arrangement, when the stopper 302 is moved toward the three connectors 109*a*, 109*b* and 109*c*, the conductive plate 111 causes a short circuit in the three sets of coils 108*a*, 108*b* and 108*c*. Once the three sets of coils 108*a*, 108*b* and 108*c* are short-circuited, if a user attempts to rotate a wheel driven by the motor 901 (e.g., rotating a rotor of the motor 901 by stepping on a pedal attached thereto; pushing/moving a bike having the wheel; letting the bike slip downhill, etc.), the magnets 221 positioned in the housing 101 rotate and induce a current in the coils causing a back electromagnetic field that opposes the magnetic force from the rotating magnets.

The induction currents in the short-circuited coils 108*a*, 108*b* and 108*c* then generates a torque T in a reverse direction that can impede the rotor assembly 222 from rotating. Without being bound by theory, the torque T can be calculated based on the equations below.

$$V = k_e \omega \quad (1)$$

$$\frac{V}{R} = I \quad (2)$$

$$I k_T = T \quad (3)$$

In Equations (1), (2) and (3) above, "V" represents voltage, "ω" represents rotational speed, "R" represents resistance (of the coils 108*a*-*c*, for example), and "I" represents electric current. "$K_e$" and "$K_T$" are constants.

According to Equation (1), when a user attempts to rotate the rotor of the motor 901 (i.e., it generates rotation speed w), a certain amount of voltage V can be generated in the coils 108*a*, 108*b* and 108*c*. The faster the rotor rotates, the larger amount of voltage V is generated. Since the coils 108*a*, 108*b* and 108*c* are short-circuited, the generated current I (from generated voltage V, according to Equation (2) above) flows back to the coils 108*a*, 108*b* and 108*c* (e.g., from one coil to another coil). According to Equations (2) and (3), the generated voltage V can cause the torque T opposite to user's action. The generated torque T can be used to prevent the rotor from rotating and therefore can be acting as a security and anti-theft mechanism.

Advantages of the security mechanism include that (1) it can operate when the power of the hub apparatus 200 is turned off (e.g., the security mechanism can function without a power supply); (2) it can generate torque in response to user actions (i.e., the faster a user rotates the rotor, the larger amount of torque can be generated to counter the rotation); (3) it can be applied to various types of wheels; (4) it can coexist with other locking devices (e.g., a physical locking device 400 to be discussed below).

In some embodiments, less than all of the coils shown as two of the coils 108a, 108b and 108c can be short-circuited. In such embodiments, the conductive plate 111 can be configured/positioned to only short-circuit two of the coils 108a, 108b and 108c by only contacting two of the connectors 109a, 109b and 109c. In some embodiments, the stopper 302 can be made of a conductive material such that the stopper 302 can directly short-circuit two or more of the coils 108a, 108b and 108c.

In the present embodiment, the rotor assembly 222 of the hub apparatus 200 (or the rotor assembly of the motor 901) is fixedly disposed in the wheel. In some embodiments, the hub apparatus 200 and the motor 901 are configured to power a wheel of the vehicle via power transmission components like belt, chain, gear sets etc. There can be a gear reduction ratio between the rotor assembly and the wheel. More particularly, the rotor assembly and the wheel do not necessary have the same rotational speed (but in proportion to each other). For example, there can be a "gear-reduction" ratio between the rotor assembly of the motor 901 and the wheel driven by the rotor. For example, a "1:6" gear-reduction ratio means when the rotor assembly rotates 360 degrees (e.g., a circle), the wheel only rotates 60 degrees (e.g., ⅙ of the circle). One advantage of the present security mechanism is that it can generate torque to prevent or impede unauthorized action in proportion to the gear reduction ratio. In other words, for vehicles with higher gear reduction ratios, the present security mechanism can generate larger torque accordingly.

In the embodiments that the power transmission components include a gear set, the gear set can be configured as follows. Traditionally, when the vehicle is parked, the gear set is shifted to "P position" or "Parking position" (where the gear set disengages from the rest of the power transmission components such as a chain) by a shift lever and the gear set can be locked. In order to utilize the technology disclosed in the present disclosure, the gear set needs to be shifted to "D position" or "Driving Position" (where the gear set engages the rest of the power transmission components) or change the configuration of the gear set in "P position" such that the gear set still engages the rest of the power transmission components in "P position."

It is also noted that in the above-described embodiments where the motor 901 is configured to power a wheel of a vehicle via power transmission components, the security unit 907 is not disposed inside the motor 901 (as shown in embodiments corresponding to FIG. 2a-3c). In such embodiments, the security unit 907 can be disposed (or appended) between the MCU 904 and the motor 901 of the vehicle.

In some embodiments, the present security mechanism can include an additional locking device by engaging the rotor of the motor 901, when the motor 901 is turned off or has been turned off for a period of time, so as to make rotating the rotor even more difficult. In some embodiments, the present security mechanism can include physical locking devices, as discussed in FIGS. 4a-4c below.

Figure 4A:
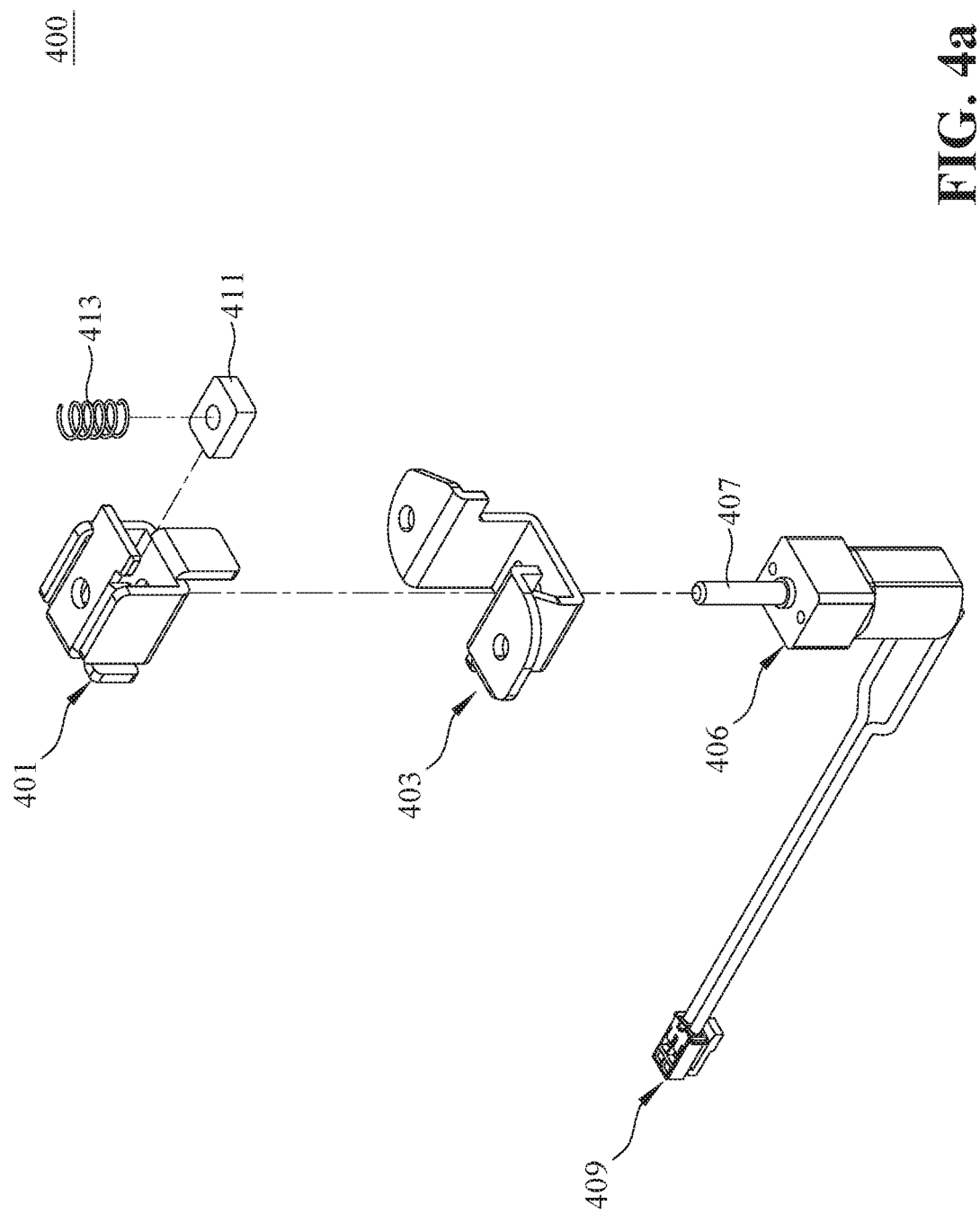
FIGS. 4a-4c illustrate components of a locking device in accordance with embodiments of the present technology.

FIG. 4a is an exploded view of a motor locking device 400 in accordance with embodiments of the present technology. The motor locking device 400 is configured to lock a motor (e.g., the motor 901; by preventing a rotor of the motor 901 from rotating relative to a stator of the motor 901) of a hub apparatus (e.g., the hub apparatus 200).

As shown in FIG. 4a, the motor locking device 400 includes a stopper 401, a stopper holder 403, an actuator 406 coupled to a rod (or a screw/threaded rod) 407, and a plug 409 configured to connect wires of the actuator 406 to a controller that supplies current to move the rod 407. The stopper holder 403 is fixedly attached to the stationary part (e.g., a stator) of an electric motor positioned inside the hub apparatus. The stopper 401 is positioned in the stopper holder 403 and is configured to be moved by the rod 407.

In some embodiments, a positioning component such as a threaded nut 411 is placed in an enclosure of the stopper 401 and biased with a spring 413. The rod 407 can be threaded and rotated by the actuator 406. The threaded rod 407 moves the nut 411 up and down on the threaded rod 407 to advance or retract the stopper 401 in and out of engagement with a surface on the rotor (e.g., the housing 101 of the hub apparatus 200). In some embodiments, the actuator 406 can be an axial solenoid valve, a linear motor, or another suitable actuator that moves the stopper 401.

In some embodiments, the spring 413 can be positioned to provide a resilient force to the stopper 401 to hold the stopper 401 to the nut 411 such that movement of the nut 411 relative to the rod 407 moves the stopper 401 toward or away from the inner surface of a housing (e.g., the housing 101). In some embodiments, the stopper 401 can be positioned adjacent to the inner surface of the housing without (actually) contacting it.

In some embodiments, the plug 409 can be coupled to a controller coupled to an electric control unit (ECU) (e.g., the ECU 902) and/or other suitable devices. In some embodiments, the ECU can lock/unlock the motor in response to a signal from an external device (e.g., a smartphone, a key fob, etc.). In some embodiments, the ECU can lock/unlock the motor without receiving a signal from an external device (e.g., a smartphone, a key fob, etc.) for a predetermined period of time (e.g., 10 minutes after the motor is turned off).

Figure 4B:
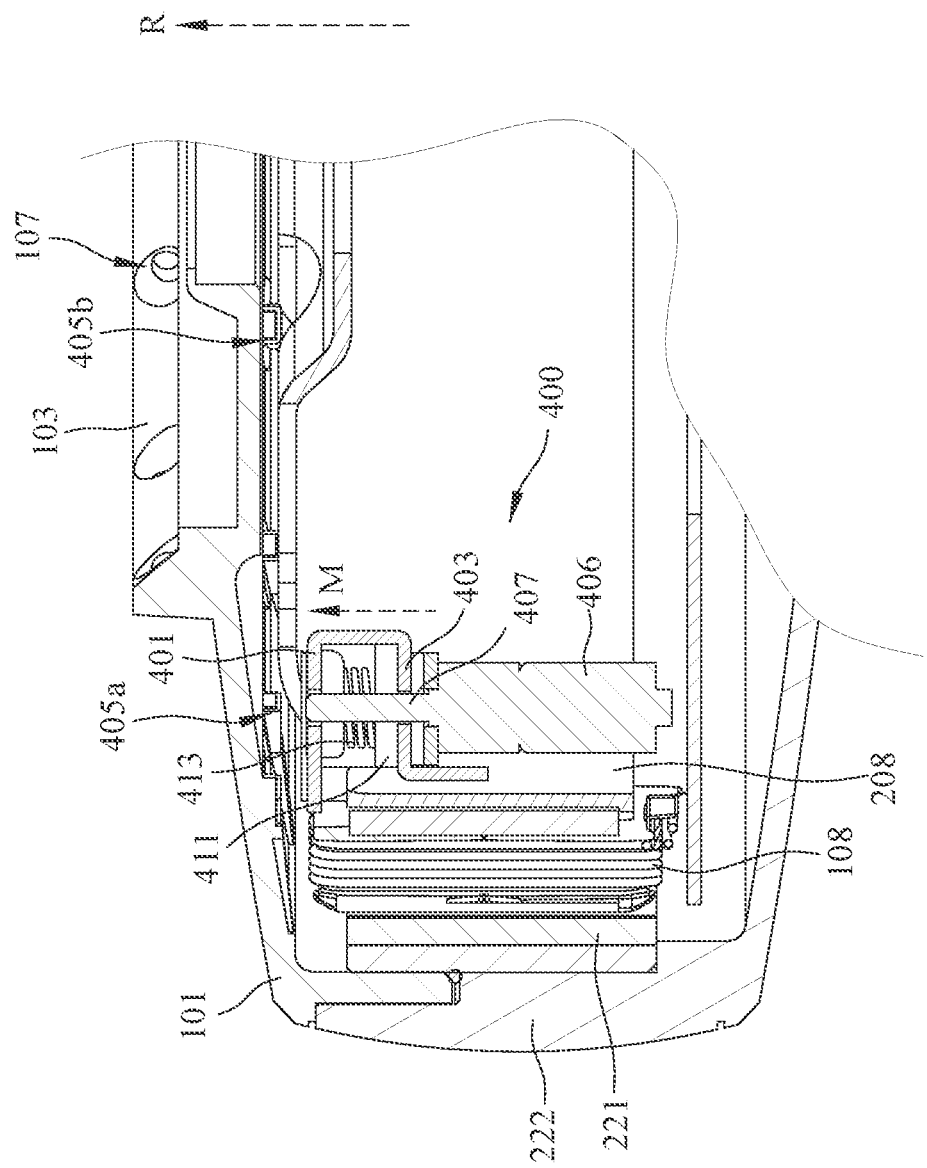
Figure 4C:
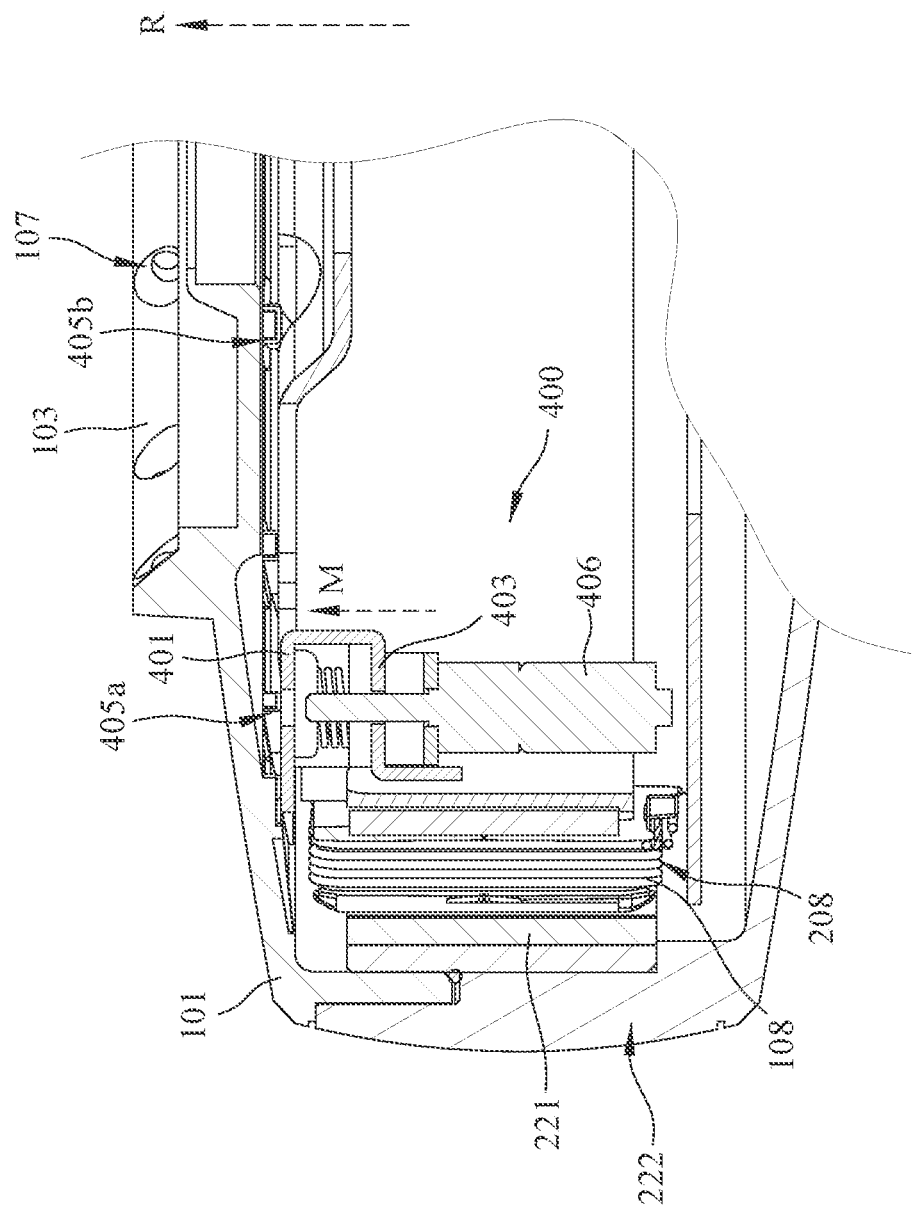

FIGS. 4b and 4c are sectional and isometric views of the motor locking device 400, showing the operation thereof. As shown, the stopper holder 403 of the motor locking device 400 is fixedly coupled to a stator assembly 208 such that a rotor assembly 222 is free to rotate (e.g., about axis R as indicated in FIG. 4c) relative to the motor locking device 400.

In the illustrated embodiments shown in FIG. 4c, the rotor assembly 222 includes the housing 101 and a number of magnets 221 attached thereto. In the illustrated embodiments, the stator assembly 208 includes a number of coils 108. As shown in FIG. 4c, two stopping bumps 405a, 405b are coupled to (or integrally formed with) the inner surface of the housing 101. The stopping bumps 405a, 405b are configured to restrain the rotor assembly 222 (e.g., the housing 101 and the magnets 221) from rotating relative to the stopper 401 (which is fixed coupled to the stator assembly 208), when the stopper 401 is in an extended, "locked" position (FIG. 4c).

When the stopper 401 is retracted in an "unlocked" position (e.g., as shown in FIG. 4b), the rotor assembly 222 can rotate relative to the stopper 401 (and the stator assembly 208). In some embodiments, there can be more than two stopping bumps coupled to the outer housing 201 so that the wheel can be locked at a number of different positions.

In FIG. 4b, the motor locking device 400 is in an "unlocked" position, and the rotor assembly 222 can rotate relative to the stator assembly 208. In such embodiments, (an edge of) the stopper 401 is flush with (an outer edge of) the stopper holder 403 and therefore the stopper 401 does not contact the stopping bumps 405a, 405b when rotating.

When the ECU (e.g., the ECU 902) instructs the actuator 406 to rotate the rod 407 (e.g., to move the stopper 401 in direction M shown in FIGS. 4b and 4c), the wheel is locked and unlocked accordingly.

Once the stopper 401 is moved toward the housing 101 (e.g., in direction M), as shown in FIG. 4c, the stopper 401 is no longer flush with the stopper holder 403, and the motor locking device 400 is at a "locked" position. Accordingly, the stopper 401 is "stopped" or restrained by one of the stopping bump 405a, 405b and cannot freely rotate relative to the rotor assembly 222. As a result, the rotor assembly 222 is locked and cannot rotate relative to the stator assembly 208.

In some embodiments, the stopping bumps can be circumferentially positioned at the inner surface of the housing 101. In such embodiments, the stopper 401 can be stopped by any one of the stopping bumps. In some embodiments, the stopping bumps can be formed in various shapes such as, a protrusion, a block, and/or other suitable shapes that can be engaged the stopper 401 when it is in the extended position.

In some embodiments, the stopping bumps can be made of a relatively-easy replaceable material such as plastic, whereas the stopper 401 can be made of a relatively hard or stiff material. In such embodiments, when one or more of the stopping bumps are damaged or have failed (e.g., caused by contacting the stopper 401), the rest of the stopping bumps can still engage the stopper 401 and lock the position of the rotor assembly 222. It is easy and convenient to replace a damaged stopping bump. As a result, the present technology provides a reliable, easy-to-maintain, mechanism to lock, stop, and/or control the rotation of an electric motor.

Figure 5:
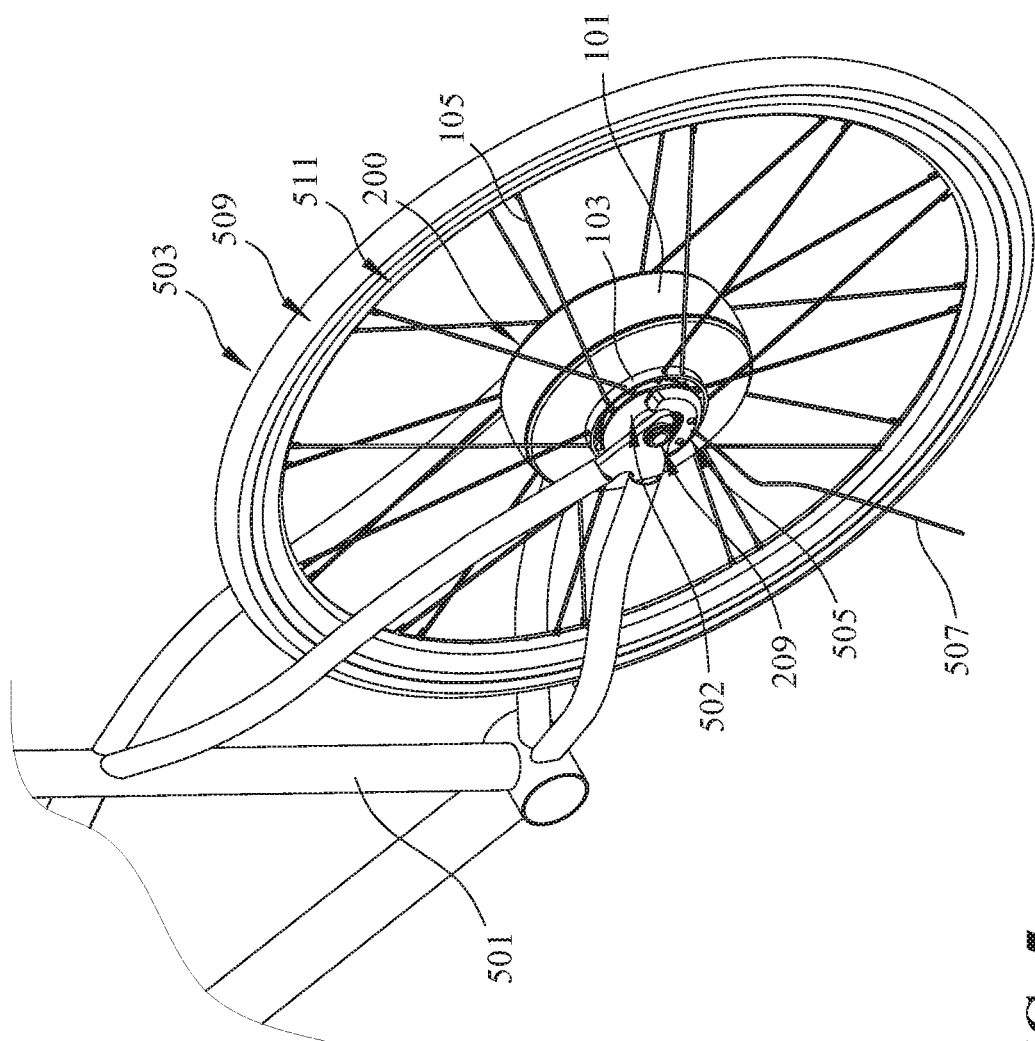
FIG. 5 illustrates a hub apparatus that is placed in a wheel in accordance with embodiments of the present technology.

FIG. 5 is an isometric view of a vehicular frame 501 supporting a hub apparatus (e.g., hub apparatus 200) in accordance with embodiments of the present technology. As shown, the shaft 209 of the hub apparatus 200 is fixedly coupled to the vehicular frame 501. The housing 101 of the hub apparatus 200 is coupled to a wheel 503 via the spokes 105 and the hub flange or ring structure 103 (as shown, a side cover 502 can be attached to the hub apparatus 200). The wheel 503 can be rotated by the hub apparatus 200 to move the vehicular frame 501. When the wheel 503 is not rotating, a charging head 505 can be coupled to the hub apparatus 200 and charge the same. In some embodiments, the charging head 505 can be coupled to the hub apparatus 200 by a magnetic force. As shown, the charging head 505 can be coupled to a power source (e.g., mains electricity) via a wire 507. In some embodiments, the wheel 503 can be a wheelset having a tire 509, a wheel rim 511, multiple spokes 105, and the hub apparatus 200.

In some embodiments, when the hub apparatus 200 starts to be charged by the charging head 505, the ECU 902 can instruct the security unit 907 to short-circuit the coils 108. In some embodiments, when the ECU 902 receives a signal indicating that the charging process is complete, the ECU 902 can instruct the security unit 907 to move the coils 108 back to their normal, working condition (e.g., not short-circuited).

In some embodiments, the security unit 907 and the locking device 400 can share the same actuator. For example, the actuator 306 for the security unit 907 (FIG. 3b) and the actuator 406 for the locking device 400 can be the same component. For example, a solenoid valve can be configured to move both the stopper 302 and the stopper 401.

Figure 6:
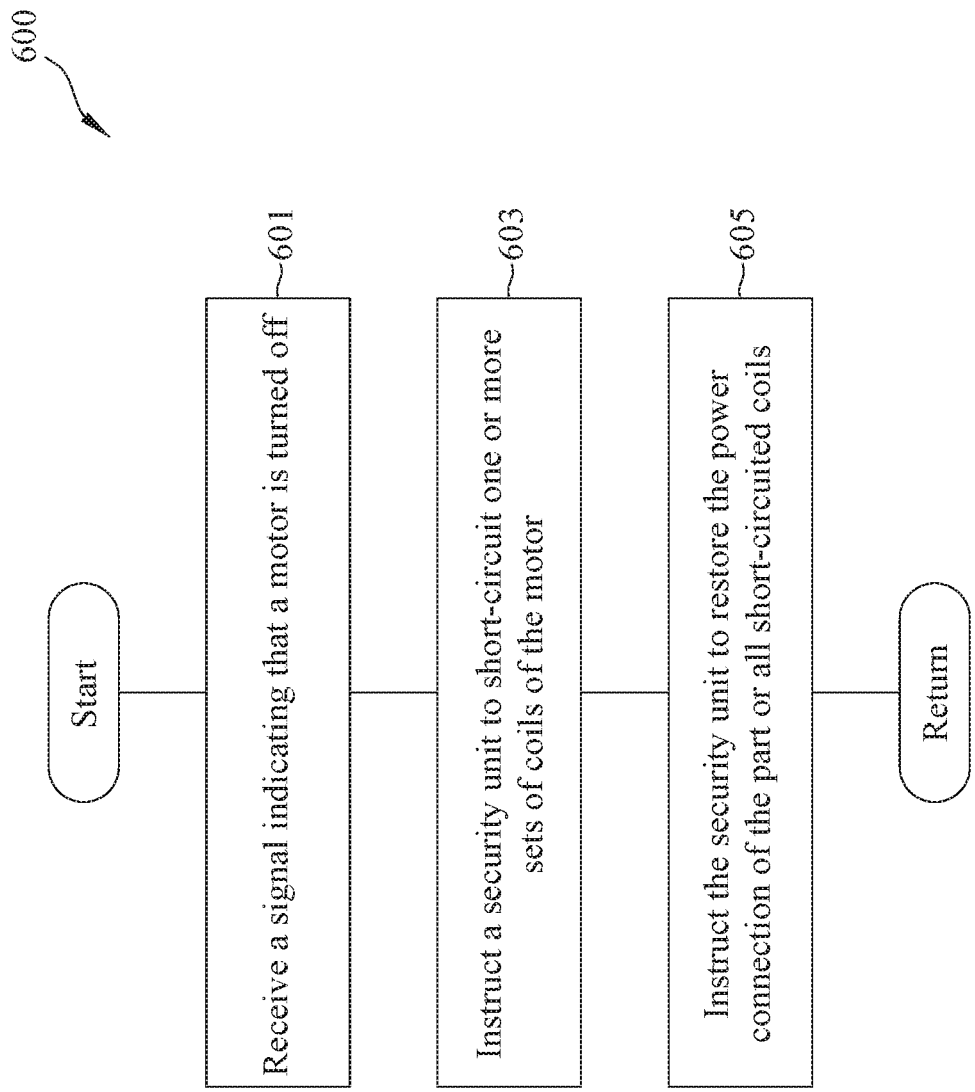
FIGS. 6-7 are flowcharts illustrating methods in accordance with embodiments of the disclosed technology.
Figure 7:
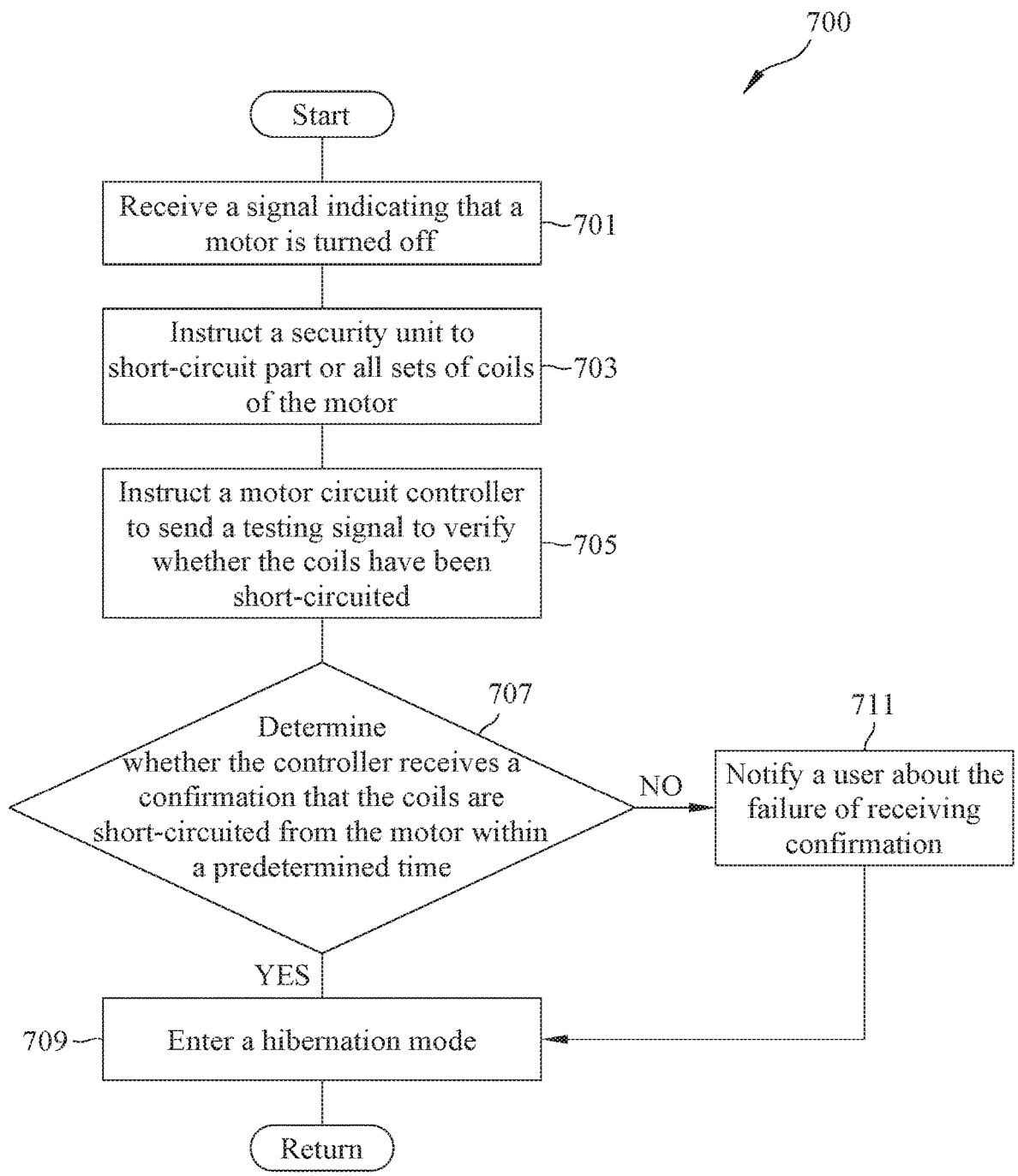

FIGS. 6 and 7 are flowcharts illustrating methods 600 and 700 performed by a programmed processor, controller, or other logic circuit in accordance with embodiments of the disclosed technology. The methods 600 and 700 are configured to manage a security system/mechanism in accordance with the present technology. In some embodiments, the methods 600 and 700 can be implemented (1) in a powertrain assembly; (2) in a vehicle system; (3) a hub apparatus; and (4) a system having a motor with a rotor and a stator, for example, the systems and apparatuses shown in FIG. 1a-5.

Referring to FIG. 6, the method 600 starts at block 601 by receiving, e.g., by a controller, a first signal indicating that a motor is turned off (e.g., a user operates a switch to turn off the motor). In some embodiments, the controller can be an electric control unit (e.g., ECU 902) of a vehicle. In other embodiments, the controller can be a processor in a portable device (e.g., a smartphone) of a user. In some embodiments, the first signal can be communicated via various wired or wireless connections.

At block 603, the method 600 continues by sending, by the controller, a second signal to instruct a security unit (e.g., security unit 907) to short-circuit part or all sets of coils of the motor. When the part or all sets of coils are short-circuited, the motor is locked by the "coil-based" security mechanism or system (e.g., system 900) disclosed in the present application. In some embodiments, the method 600 can include activating a physical locking device (e.g., locking device 400) so as to enhance security of the motor.

At block 605, the controller instructs the security unit to restore the power connection of the part or all short-circuited coils. The motor is then "unlocked" and can be operated (e.g., to drive a vehicle). The method 600 then returns for further process.

Referring to FIG. 7, the method 700 starts at block 701 by receiving, by a controller, a first signal indicating that a motor is turned off (e.g., a user operates a switch to turn off the motor). In some embodiments, the controller can be an electric control unit of a vehicle. In other embodiments, the controller can be a processor in a portable device (e.g., a smartphone) of a user. At block 703, the method 700 continues by sending, by the controller, a second signal to instruct a security unit to short-circuit part or all sets of coils of the motor. In some embodiments, the first and second signals can be communicated via various wired and/or wireless connections.

At block 705, the controller instructs a circuit controller (e.g., the circuit controller 906 of the MCU 904) to send a testing signal to verify whether the coils have been short-circuited. At decision block 707, the method 700 determines whether the controller can receive a confirmation that the coils are short-circuited (e.g., from the circuit controller 906 of the MCU 904) within a predetermined time period (e.g., 0.1-5 seconds).

If the determination at block 707 is affirmative, then the process goes to block 709, where the controller enters a hibernation mode. If the determination at block 707 is negative (which means the confirmation (e.g., a confirmation signal) is not successfully received by the controller), then the process goes to block 711, where the controller notifies a user (e.g., sending a notification to a user mobile device or a display on the vehicle) about the failure of receiving confirmation (or the failure of confirmation), and then the controller enters a hibernation mode. In some embodiments, the controller can instruct other components (e.g., the circuit controller) to go hibernate as well. The method 700 then returns for further process. In some embodiments, the circuit controller can enter a hibernation mode itself after sending the confirmation to the controller.

In some embodiments, the method 700 can include activating a physical locking device (e.g., locking device 400) so as to enhance security of the motor. In some embodiments, the process of activating the physical locking device can be performed at block 709 or block 711. In other embodiments, the process of activating the physical locking device can be performed at block 701. In some embodiments, the user can receive a notification when the physical locking device is activated/enabled.

In some embodiments, the method of the present disclosure can include, for example, (1) receiving, by a controller, a signal regarding turning off the vehicle; (2) instructing, by the controller, a security unit to short-circuit a plurality of coils of a motor in the vehicle; (3) instructing, by the controller, a circuit controller to send a testing signal verify whether the plurality of coils are short-circuited; and (4) entering a hibernation mode when receiving a confirmation signal that the plurality of coils are short-circuited. In some embodiments, the method can include instructing, by the controller, the circuit controller to hibernate. In some embodiments, the method can include activating, by the controller, a locking device by instructing an actuator of the locking device to move a stopper of the locking device to contact a rotor assembly of the motor of the vehicle, when the controller does not receive the confirmation signal that the plurality of coils are short-circuited. In some embodiments, the locking device can be activated when receiving the signal regarding turning off the vehicle.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A hub apparatus for driving a vehicle, comprising:
   a motor having multiple sets of coils;
   a drive circuitry electrically coupled to the multiple sets of coils; and
   a security unit electrically coupled to the drive circuitry and the multiple sets of coils, the security unit having a conducive plate being configured to be moved by an actuator toward the multiple sets of coils, so as to short-circuit at least one set of the multiple sets of coils, the actuator being moved responsive to a signal indicating that the motor is turned off, wherein, after the actuator is moved, a testing signal is sent to the drive circuitry so as to confirm that at least one set of the multiple sets of coils has been short-circuited,
   wherein the motor includes a stator assembly having the multiple sets of coils, and
   wherein the motor comprises a housing rotatably coupled to a shaft, and wherein the stator assembly is positioned inside the housing and coupled to the shaft, and wherein the stator assembly is electrically coupled to a battery assembly enclosed in the stator assembly, and wherein the stator assembly includes a coil assembly including the multiple sets of coils, and wherein the coil assembly is circumferentially positioned about the shaft.

2. The hub apparatus of claim 1, wherein the actuator comprises a solenoid valve configured to move the conductive plate to short-circuit the at least one set of the multiple sets of coils.

3. The hub apparatus of claim 1, wherein the actuator comprises a linear motor configured to move the conductive plate to short-circuit the at least one set of the multiple sets of coils.

4. The hub apparatus of claim 1, wherein the security unit comprises a switch configured to short-circuit the at least one set of the multiple sets of coils, and wherein the switch comprises:
   a mechanical switch configured to short-circuit the at least one set of the multiple sets of coils; or
   a transistor-based switch configured to short-circuit the at least one set of the multiple sets of coils.

5. The hub apparatus of claim 1, wherein the at least one short-circuited set of coils is configured to generate, in response to a change of a magnetic field caused by a rotation of a rotor assembly, a torque in a reverse direction of the rotation of the rotor assembly.

6. The hub apparatus of claim 5, further comprising:
   a locking device configured to at least partially prevent the rotor assembly from rotating relative to the stator assembly, the locking device having a stopper and an actuator coupled to the stopper, the stopper being configured to be moved by the actuator.

7. The hub apparatus of claim 1, wherein the motor includes a rotor assembly having the multiple sets of coils, and wherein the at least one short-circuited set of coils is configured to generate, in response to a change of a magnetic field caused by a rotation of the rotor assembly, a torque in a reverse direction of the rotation of the rotor assembly.

8. The hub apparatus of claim 1, wherein the drive circuitry is configured to control the multiple sets of coils so as to generate a three-phase alternating current.

9. The hub apparatus of claim 1, further comprising a relay electrically coupled between multiple sets of coils and the security unit.

10. The hub apparatus of claim 9, wherein the relay is configured to form an open circuit when a current passing through the multiple sets of the coils exceeds a threshold value.

11. The hub apparatus of claim 1, wherein the signal indicating that the motor is turned off also indicates that the motor has been turned off for a predetermined time period.

12. A vehicle with a security system, the vehicle comprising:
   a motor having multiple sets of coils;
   a controller electrically coupled to the motor;
   a drive circuitry electrically coupled to the multiple sets of coils; and
   a security system having a security unit electrically coupled to the drive circuitry and the multiple sets of coils, the security unit having a conductive plate configured to be moved by an actuator toward the multiple sets of coils so as to short-circuit at least one set of the multiple sets of coils, the actuator being moved responsive to a signal indicating that the motor is turned off, wherein, after the actuator is moved, a testing signal is sent to the drive circuitry so as to confirm that at least one set of the multiple sets of coils has been short-circuited,
   wherein the motor includes a rotor assembly and a stator assembly, and wherein the security system further comprises:

a locking device configured to at least partially prevent the rotor assembly from rotating relative to the stator assembly, the locking device having a stopper and an actuator coupled to the stopper, the stopper being configured to be moved by the actuator, wherein the stator assembly comprises a coil assembly including the multiple sets of coils, and wherein the coil assembly is circumferentially positioned about a shaft coupled to the rotor assembly.

13. The vehicle of claim 12, wherein the actuator comprises a solenoid valve configured to move the conductive plate to short-circuit the at least one set of the multiple sets of coils.

14. The vehicle of claim 12, further comprising:
a wheel driven by the motor, wherein the motor is configured to drive the wheel via a power transmission component.

15. The vehicle of claim 12, further comprising a wheel driven by the motor, wherein a rotor assembly of the motor is fixedly coupled to the wheel.

16. A method for securing a vehicle, comprising:
receiving, by a controller, a signal regarding turning off the vehicle;
instructing, by the controller, an actuator of a security unit to move a conductive plate of the security unit toward plurality of coils of a motor in the vehicle so as to short-circuit at least one the plurality of coils of the motor;
instructing, by the controller, a circuit controller to send a testing signal to a drive circuitry electrically coupled to the plurality of coils, so as to verify whether at least one of the plurality of coils is short-circuited;
entering a hibernation mode when receiving a confirmation signal that part or all of the plurality of coils are short-circuited; and
activating, by the controller, a locking device by instructing an actuator of the locking device to move a stopper of the locking device to contact a rotor assembly of the motor of the vehicle, when the control receives the confirmation signal that part or all of the plurality of coils are short-circuited,
wherein the plurality of coils is circumferentially positioned about a shaft coupled to the rotor assembly.

17. The method of claim 16, further comprising:
sending a notification to a user mobile device or a display on the vehicle if the confirmation is not successfully received: and
entering the hibernation mode after sending the notification.

* * * * *